(12) United States Patent
Ishizuka et al.

(10) Patent No.: US 7,753,598 B2
(45) Date of Patent: Jul. 13, 2010

(54) LENS BARREL

(75) Inventors: Kazunori Ishizuka, Kanagawa (JP);
Toshiharu Suzuki, Saitama (JP);
Shinsuke Shoji, Saitama (JP)

(73) Assignee: Hoya Corporation, Tokyo (JP)

( * ) Notice: Subject to any disclaimer, the term of this patent is extended or adjusted under 35 U.S.C. 154(b) by 292 days.

(21) Appl. No.: 11/780,006

(22) Filed: Jul. 19, 2007

(65) Prior Publication Data

US 2008/0019685 A1    Jan. 24, 2008

(30) Foreign Application Priority Data

Jul. 20, 2006    (JP)    ............................. 2006-197670

(51) Int. Cl.
*G03B 5/02* (2006.01)

(52) U.S. Cl. ..................................................... 396/349

(58) Field of Classification Search .......... 396/348–350
See application file for complete search history.

(56) References Cited

U.S. PATENT DOCUMENTS

| 6,978,089 | B2 | 12/2005 | Nomura et al. | |
| 7,097,367 | B2 | 8/2006 | Nomura | |
| 2004/0228626 | A1* | 11/2004 | Endo et al. | 396/349 |
| 2006/0018654 | A1* | 1/2006 | Nuno et al. | 396/349 |
| 2006/0034604 | A1* | 2/2006 | Nomura et al. | 396/349 |
| 2006/0045516 | A1* | 3/2006 | Ishizuka et al. | 396/349 |
| 2006/0045517 | A1* | 3/2006 | Kato | 396/349 |
| 2006/0193625 | A1* | 8/2006 | Nomura | 396/349 |
| 2006/0233543 | A1* | 10/2006 | Homme | 396/349 |
| 2007/0183769 | A1 | 8/2007 | Ishizuka | |

FOREIGN PATENT DOCUMENTS

| JP | 2003-315861 | 11/2003 |
| JP | 2004-233921 | 8/2004 |

OTHER PUBLICATIONS

U.S. Appl. No. 11/753,105, filed May 24, 2007, Ishizuka et al.

* cited by examiner

*Primary Examiner*—W. B. Perkey
*Assistant Examiner*—Dennis Hancock
(74) *Attorney, Agent, or Firm*—Greenblum & Bernstein, P.C.L.

(57) ABSTRACT

A lens barrel movable between a first state, in which optical elements of a photographing optical system are all aligned on an optical axis, and a second state in which at least one of the optical elements is retracted to a radially-retracted position and moved rearward, the lens barrel includes a support ring; a radially-retractable optical element holding frame which supports the radially-retractable optical element, and is supported by the support ring to be movable between a first position corresponding to the first state and a second position corresponding to the second state; and an optical-axis-direction-movement limit device which limits movement of the radially-retractable optical element holding frame in the optical axis direction relative to the support ring when the radially-retractable optical element holding frame is at the first position.

20 Claims, 19 Drawing Sheets

LENS BARREL

BACKGROUND OF THE INVENTION

1. Field of the Invention

The present invention relates to a lens barrel which can be retracted to an accommodation state in which the length of the lens barrel is shorter than that in a ready-to-photograph state when no photographing operation is carried out.

2. Description of the Related Art

Miniaturization of cameras is always advancing, and therefore, miniaturization of retractable photographic lenses for cameras, which retract to reduce the length thereof in a non-operating state, has been in increasing demand. As a solution to meet this demand, the assignee of the present invention has proposed a retractable lens which is disclosed in U.S. Pat. No. 6,978,089 (U.S. patent application Ser. No. 10/368,342). This retractable lens is characterized by having a plurality of optical elements of a photographing optical system aligned with an optical axis in a ready-to-photograph state (photographable state), and apart of the plurality of optical elements is radially retracted to a position (radially-retracted position) deviating from the optical axis of the remaining optical elements while being retracted, together with the remaining optical elements on the optical axis thereof, in the direction of the optical axis of the photographing optical system when the photographic lens is fully retracted. When this retractable lens is in an accommodation state (fully retracted state), a reduction in length of the retractable lens is achieved by an arrangement wherein a radially-retractable optical element, which has been retracted from an optical path on the optical axis, is positioned in an axial range substantially identical to an axial range in the optical axis direction in which the remaining optical elements that remain on the optical axis are positioned.

In the lens barrel including a radially-retractable optical element like the above described radially-retractable optical element, the radially-retractable optical element must be moved to the photographable position thereof on a photographing optical axis securely with a high degree of precision when the lens barrel moves to an operating state (ready-to-photograph state) from a non-operating state. For instance, in the lens barrel disclosed in the U.S. Pat. No. 6,978,089, the radially-retractable optical element holding frame which holds the radially-retractable optical element is biased in a direction toward the photographable position thereof while the retractable lens is provided with a stop mechanism for determining the limit of movement of the radially-retractable optical element holding frame in this biasing direction to carry out positioning of the radially-retractable optical element. In this type of positioning mechanism for the radially-retractable optical element, it is required that the radially-retractable optical element does not either come off or slip out of place at the stop mechanism even if a strong impact is applied thereto and that the radially-retractable optical element is made to stop securely with stability at the photographable position thereof. More specifically, if the movable support mechanism for the radially-retractable optical element holding frame is provided with an amount of play which allows the radially-retractable optical element holding frame to move slightly in an optical axis direction (thrust direction), there is a possibility that the engagement of the radially-retractable optical element holding frame with the stop mechanism accidentally releases in the event of the stop mechanism receiving an external impactive force when, e.g., the camera in an operating state is accidentally dropped on the ground. To prevent this problem from occurring, there is a demand for a support mechanism which prevents the radially-retractable optical element holding frame from moving in the thrust direction unnecessarily and makes it possible to stop and hold the radially-retractable optical element securely at the photographable position thereof.

SUMMARY OF THE INVENTION

The present invention provides a lens barrel including a radially-retractable optical element movable between a removed position eccentrically away from an optical axis and a photographable position on the optical axis, wherein the radially-retractable optical element can be reliably stopped and held in the photographable position.

According to an aspect of the present invention, a lens barrel is provided, which is movable between a first state, in which a plurality of optical elements of a photographing optical system are all aligned on an optical axis, and a second state in which at least one radially-retractable optical element included in the plurality of optical elements is retracted to a radially-retracted position which is eccentric with respect to the optical axis and moved rearward in the optical axis direction, the lens barrel including a support ring; a radially-retractable optical element holding frame which supports the radially-retractable optical element, and is supported by the support ring to be movable between a first position corresponding to the first state, in which the radially-retractable optical element is positioned on the optical axis, and a second position corresponding to the second state, in which the radially-retractable optical element is positioned at the radially-retracted position; and an optical-axis-direction-movement limit device which limits movement of the radially-retractable optical element holding frame in the optical axis direction relative to the support ring when the radially-retractable optical element holding frame is at the first position.

It is desirable for the optical-axis-direction-movement limit device to include an outward projection which projects from the radially-retractable optical element holding frame in a direction substantially orthogonal to the optical axis; and an upright wall portion formed on the support ring, and positioned to face a surface of the outward projection in the optical axis direction when the radially-retractable optical element holding frame is at the first position.

It is desirable for the radially-retractable optical element holding frame to rotate about a pivot substantially parallel to the optical axis, wherein the optical-axis-direction-movement limit device includes an outward projection which projects from the radially-retractable optical element holding frame in a radial direction of the pivot, and an upright wall portion formed on the support ring, and positioned to face a surface of the outward projection in the optical axis direction when the radially-retractable optical element holding frame is at the first position.

It is desirable for the radially-retractable optical element holding frame to include a shaft support portion supported by the pivot to be rotatable about the pivot; and a holding frame portion which radially extends from the shaft support portion and supports the radially-retractable optical element. The outward projection projects from an outer peripheral surface of one of the shaft support portion and the holding frame portion.

It is desirable for the support ring to include an inner flange portion which is positioned away from the upright wall portion in the optical axis direction so as to face the upright wall portion, and for the outward projection to enter in between the inner flange portion and the upright wall portion when the radially-retractable optical element holding frame moves to the first position.

It is desirable for the support ring to include a projection which projects from the inner flange portion, and for the upright wall portion to be formed as a wide free end of the projection.

It is desirable for the inner flange portion of the support ring to include a positioning portion which comes into contact with the radially-retractable optical element holding frame to thereby determine a limit of movement of the radially-retractable optical element holding frame at the first position.

It is desirable for the optical-axis-direction-movement limit device to allow the radially-retractable optical element holding frame to move in the optical axis direction relative to the support ring when the radially-retractable optical element holding frame moves from the first position to the second position.

It is desirable for the radially-retractable optical element to be one of the plurality of the optical elements of the photographing optical system which is positioned between frontmost and rearmost optical elements of the plurality of the optical elements of the photographing optical system.

It is desirable for the support ring to be guided linearly in the optical axis direction without rotating.

It is desirable for the lens barrel to be a retractable lens barrel, and for the lens barrel to move from the first state to the second state when fully retracted.

It is desirable for the radially-retractable optical element holding frame to be biased in a direction toward the first position by a spring.

It is desirable for the radially-retractable optical element holding frame to be biased in the optical axis direction away from the optical-axis-direction-movement limit device to abut against a stop portion of the support ring by a spring.

It is desirable for the holding frame portion to be formed as a ring-shaped holder and positioned inside the support ring.

In an embodiment, a lens barrel is provided, including a support ring movable in a direction parallel to an optical axis; a radially-retractable optical element holding frame which supports a radially-retractable optical element included in a plurality of optical elements of a photographing optical system, and is supported by the support ring to be movable between a first position, in which the radially-retractable optical element is positioned on the optical axis, and a second position, in which the radially-retractable optical element is positioned in a radially-retracted position which is eccentric with respect to the optical axis; a positioning portion which is provided inside the support ring and comes into contact with the radially-retractable optical element holding frame to thereby determine a limit of movement of the radially-retractable optical element holding frame at the first position; and an optical-axis-direction-movement limit device which limits movement of the radially-retractable optical element holding frame in the optical axis direction relative to the support ring when the radially-retractable optical element holding frame comes into contact with the positioning portion.

According to the present invention, a lens barrel including a radially-retractable optical element movable between a removed position eccentrically away from an optical axis and a photographable position on the optical axis is achieved, wherein the radially-retractable optical element can be reliably stopped and held in the photographable position.

The present disclosure relates to subject matter contained in Japanese Patent Application No. 2006-197670 (filed on Jul. 20, 2006) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

Figure 1:
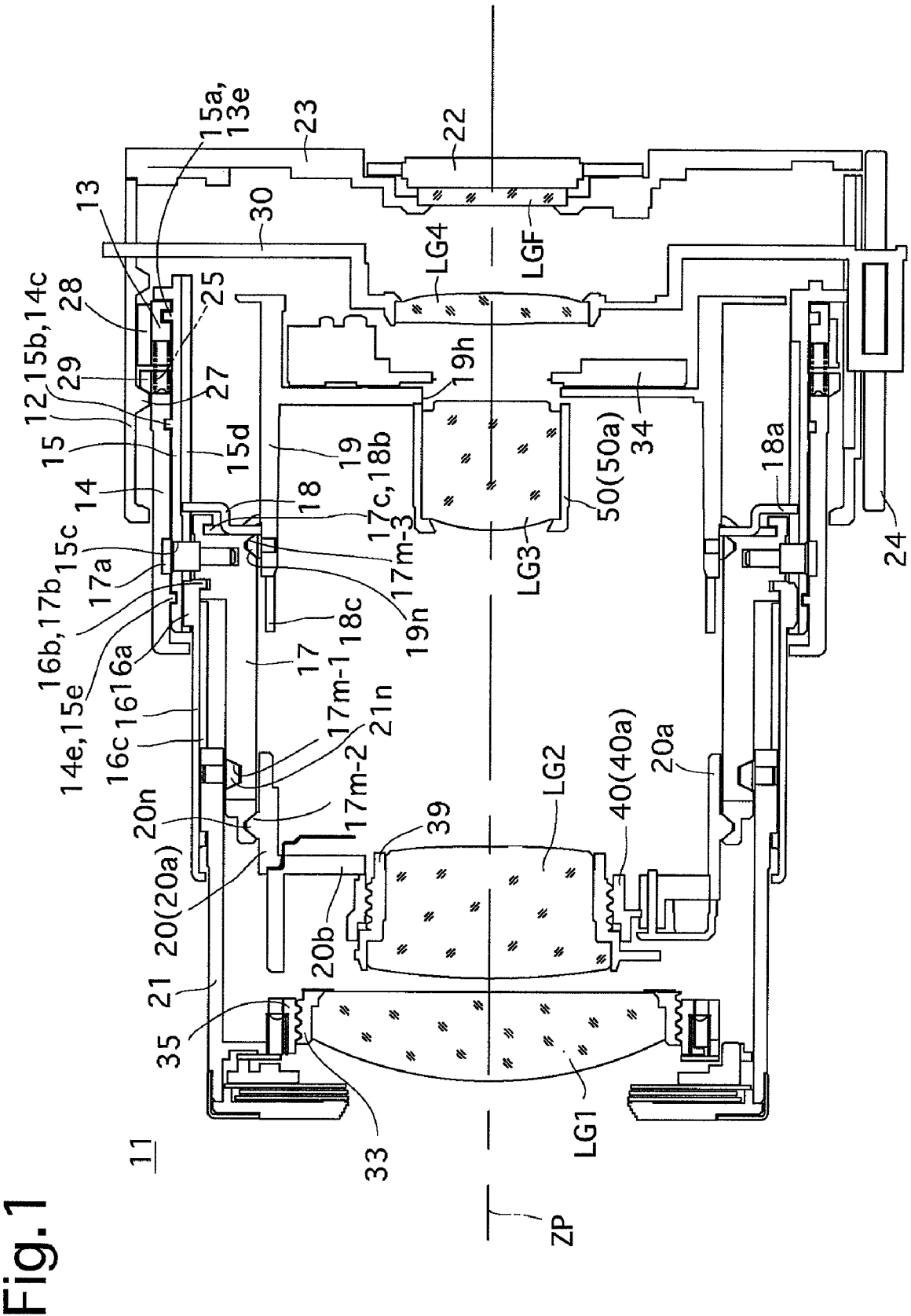
FIG. 1 is a longitudinal sectional view of a zoom lens barrel in a photographable state at the wide-angle extremity, according to the present invention.
Figure 2:
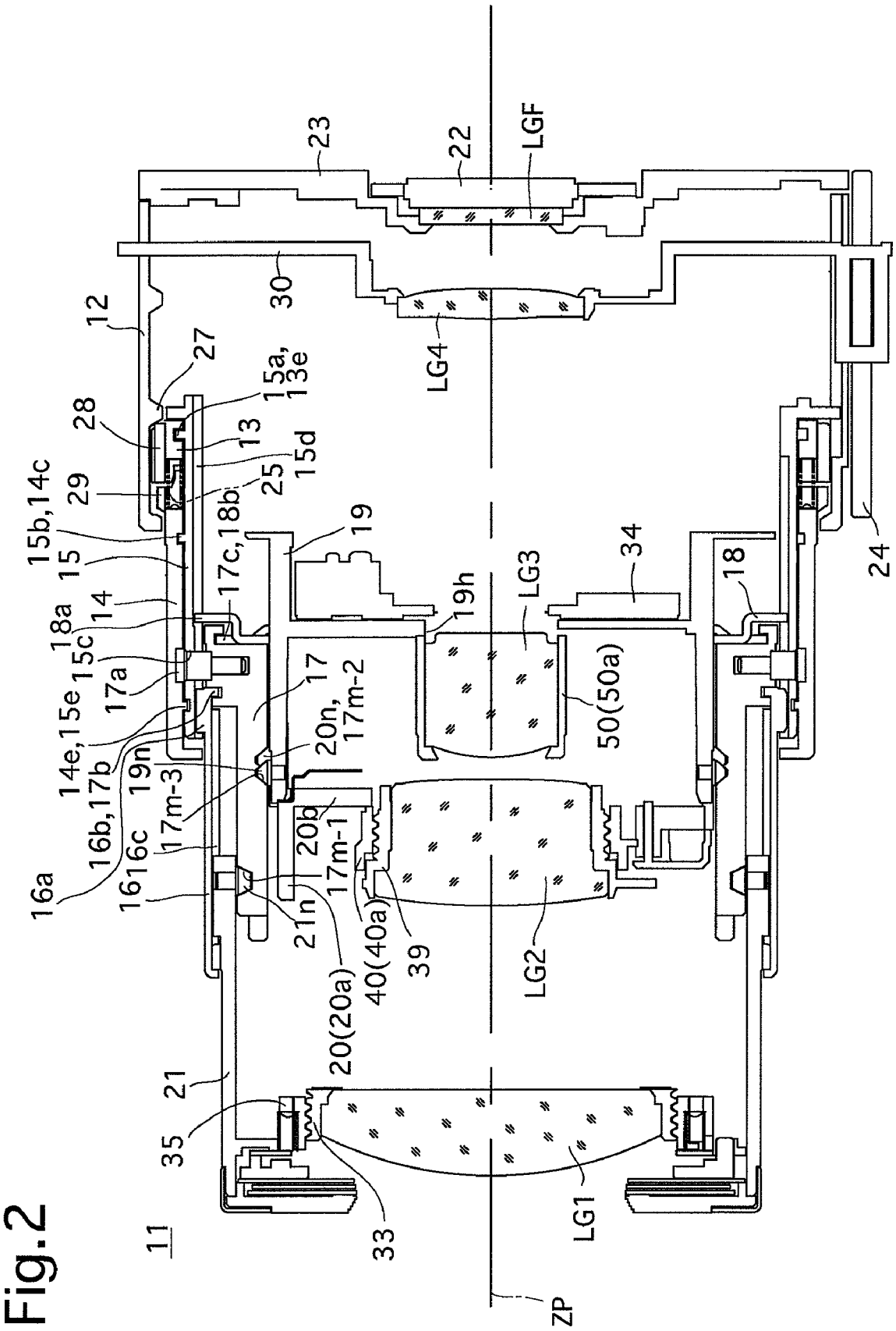
FIG. 2 is a longitudinal sectional view of the zoom lens barrel in a photographable state at the telephoto extremity, according to the present invention.
Figure 3:
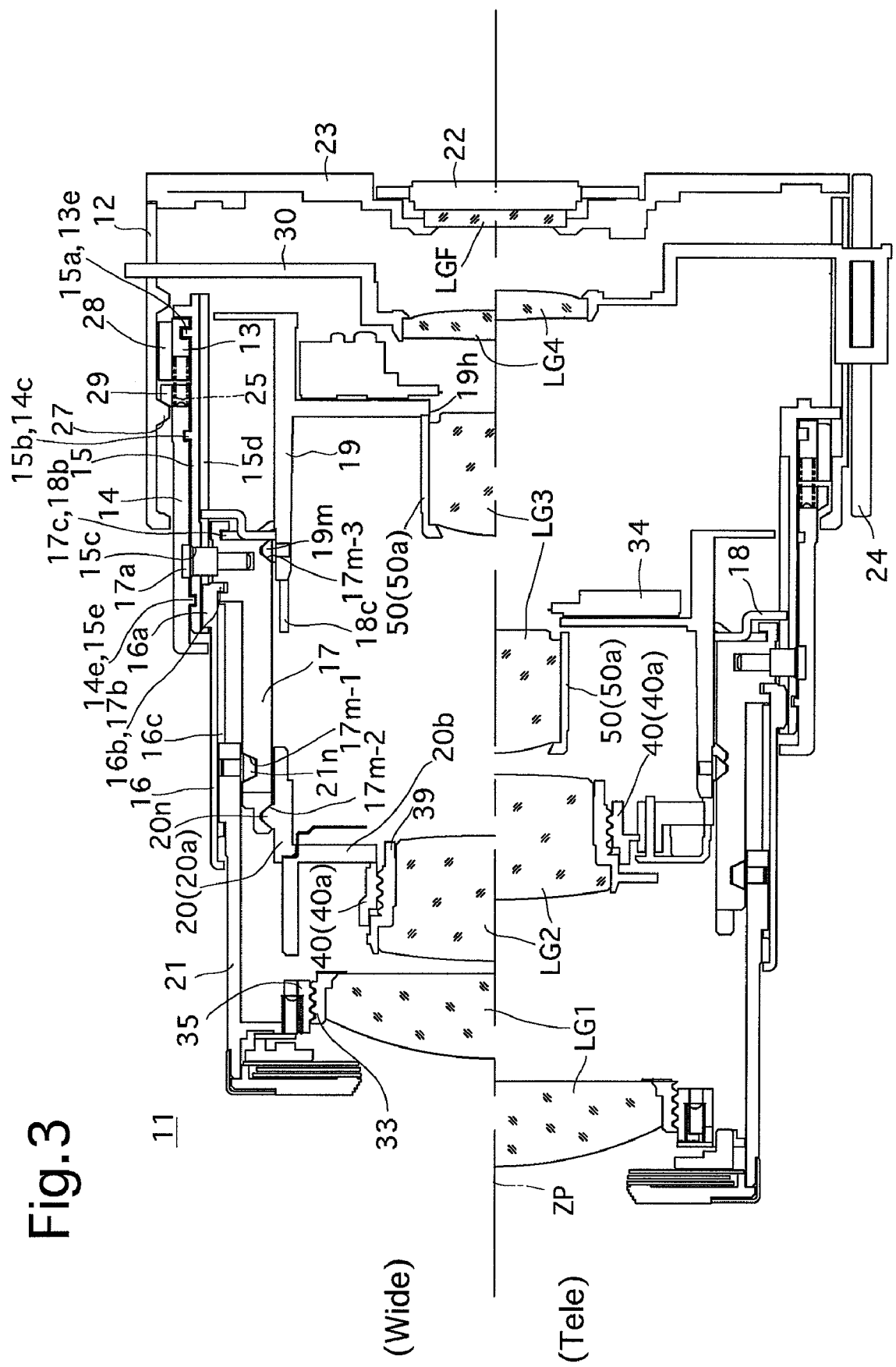
FIG. 3 is a longitudinal sectional view of the zoom lens barrel simultaneously showing the photographable state at the wide-angle extremity (shown above the optical axis) and the photographable state at the telephoto extremity (shown below the optical axis) of the zoom lens barrel, according to the present invention.

A zoom lens barrel (zoom lens) 11 of a digital camera shown in the sectional views of FIGS. 1 through 4 extends forward (telescopes) toward the object side, as shown in FIG. 1 through 3, to be extended in length along a photographing optical axis ZP in a photographable state, and retracts (contracts) in the optical axis direction to a non-photographable state (accommodation state). FIG. 1 shows the photographable state at the wide-angle extremity of the zoom lens barrel 11, and FIG. 2 shows the photographable state at the telephoto extremity of the zoom lens barrel 11. FIG. 3 shows the photographable state at the wide-angle extremity above the photographing optical axis ZP and the photographable state at the telephoto extremity below the photographing optical axis ZP. In the accommodation state shown in FIG. 4, the zoom lens barrel 11 is retracted into a camera body (not shown).

The zoom lens barrel 11 is provided, inside a stationary barrel (housing) 12, with a plurality of annular members, i.e., a helicoid ring 13, a first telescoping barrel 14, a first linear guide ring 15, a second telescoping barrel 16, a cam ring 17, a second linear guide ring 18, a third-lens-group support ring 19, a second-lens-group support ring 20, a first-lens-group support barrel 21, a first-lens-group frame 33 and a first-lens-group adjusting ring 35 which are all concentrically provided on a common axis (photographing optical axis ZP).

The photographic optical system of the zoom lens barrel 11 includes a first lens group LG1, a second lens group LG2, a third lens group LG3, a fourth lens group LG4, a low-pass filter LGF, and a CCD (imaging device) 22, in that order from the object side. A shutter unit 34 having a shutter and a diaphragm is provided between the third lens group LG3 and the fourth lens group LG4. Out of the first through fourth lens groups LG1 through LG4 provided in this photographing optical system, the diameter of the first lens group LG1 is the largest, and the sum of the diameters of the second lens group LG2 and the third lens group LG3 is substantially equal to the diameter of the first lens group LG1. Furthermore, the lens thicknesses of the second lens group LG2 and the third lens group LG3 in the optical axis direction are substantially the same. The curvature centers of the optical elements from the first lens group LG1 to the CCD 22 are all aligned in series on the common photographing optical axis (common optical axis) ZP in the optical axis direction when the zoom lens barrel 11 is in the photographable state shown in FIGS. 1 through 3. Zooming is performed by respectively moving the first through third lens groups LG1 through LG3 along the photographing optical axis ZP (toward the object side and the image side) in accordance with a predetermined zoom path, and focusing is performed by moving the fourth lens group LG4 along the photographing optical axis ZP. It should be noted that in the following descriptions, "optical axis direction" refers to a direction along (or parallel to) the photographing optical axis ZP, in which a direction toward the object side designates a forward direction (front) and a direction toward the image side designates a rearward direction (rear).

Figure 14:
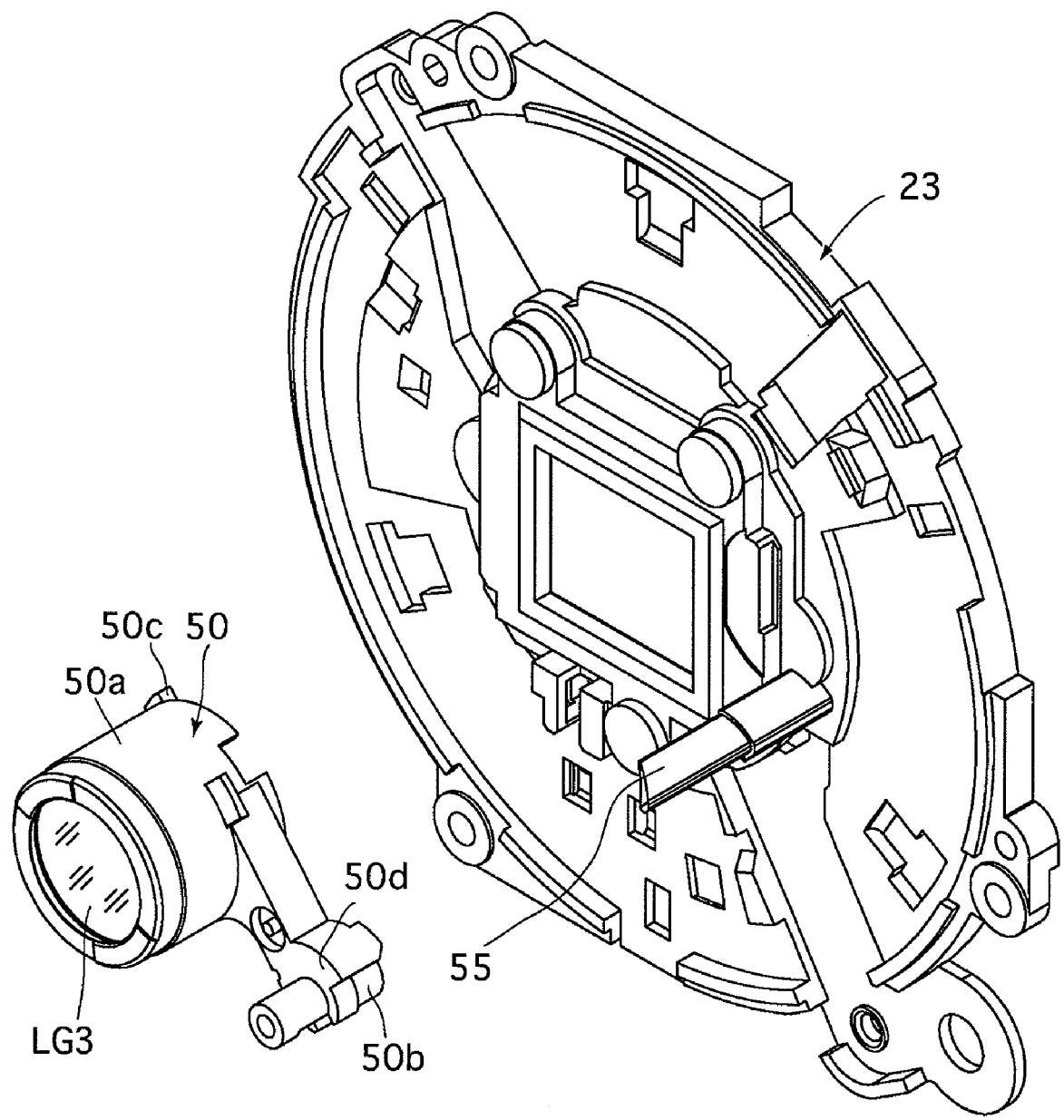
FIG. 14 is an exploded perspective view of the third-lens-group frame and a stationary CCD holder, showing the outward appearance of a third-lens-group-retracting cam-bar formed integral with the stationary CCD holder.

A stationary CCD holder 23, the shape of which is shown in FIG. 14, is fixed to the rear end of the stationary barrel 12. The CCD 22 and the low-pass filter LGF are fixed to (supported by) the stationary CCD holder 23. A fourth-lens-group frame 30 which supports the fourth lens group LG4 that is positioned in front of the low-pass filter LGF is linearly guided in the optical axis direction via guide shafts 24 (only one of which is shown in FIGS. 1 through 4) fixed to the stationary barrel 12, and can be driven forwards/rearwards in the optical axis direction via a focusing motor (not shown).

Figure 5:
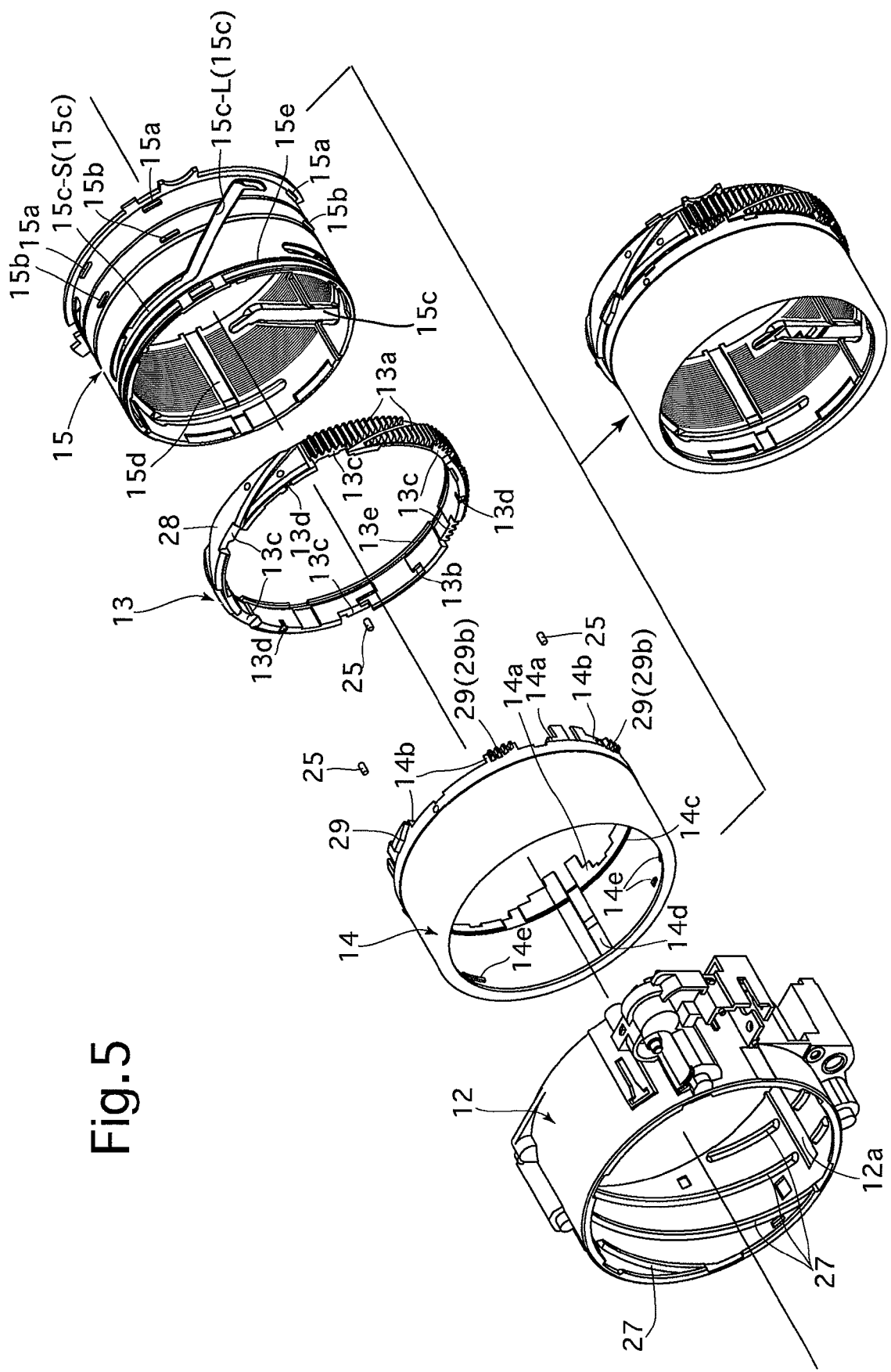
FIG. 5 is an exploded perspective view of a portion of the zoom lens barrel shown in FIG. 4 which includes a stationary barrel, a helicoid ring, a first telescoping barrel, and a first linear guide ring.

The helicoid ring 13 is positioned inside the stationary barrel 12 and supported thereby, and a male helicoid (male helicoidal threads) 28 formed on the outer peripheral surface of the helicoid ring 13 is engaged with the female helicoid (female helicoidal threads) 27 formed on the inner peripheral surface of the stationary barrel 12. As shown in FIG. 5, a circumferential gear 13a is discontinuously formed on the outer peripheral surface of the male helicoid 28. The zoom lens barrel 11 is provided with a zoom motor (not shown). The drive force of this zoom motor is transmitted to the circumferential gear 13a via a reduction gear train (not shown) to rotate the helicoid ring 13.

As shown in FIG. 5, three rotational-transfer recesses 13b are formed on the inner peripheral surface of the helicoid ring 13, and three rotational-transfer projections 14a, which are respectively engaged with the three rotational-transfer recesses 13b, are provided on the rear end circumferential portion of the first telescoping barrel 14. Although the three rotational-transfer recesses 13b are provided circumferentially at substantially equi-angular intervals and the three rotational-transfer projections 14a are provided circumferentially at substantially equi-angular intervals, only one rotational-transfer recess 13b and two rotational-transfer projections 14a are shown in FIG. 5. Due to the engagement of the three rotational-transfer recesses 13b with the three rotational-transfer projections 14a, the first telescoping barrel 14 integrally rotates with the helicoid ring 13.

As shown in FIG. 5, a plurality of rearward projections 14b are formed on the rear end portion of the first telescoping barrel 14 at different circumferential positions thereof. A plurality of outer radial protrusions 29 are provided on the outer peripheral surfaces of the plurality of rearward projections 14b, respectively. Six front-end recesses 13c are provided on the front end portion of the helicoid ring 13 so that portions of the helicoid thread 28a are cut out. The rearward projections 14b are respectively engaged into the front-end recesses 13c. The outer radial protrusions 29 are smaller protrusions than the male helicoidal threads 28. In a state where the rearward projections 14b are respectively engaged in the front-end recesses 13c, the outer radial protrusions 29 complement (occupy) the cut-out portions (i.e., the front-end recesses 13c) of the male helicoid 28, respectively, so that each outer radial protrusion 29 and the associated helicoidal thread ridge of the male helicoid 28 become one continuous helicoid thread ridge (see FIGS. 1 through 4).

Three spring-accommodating holes 13d are formed on the front end surface of the helicoid ring 13 at substantially equiangular intervals in the circumferential direction thereof. Three compression coil springs 25 are accommodated in the spring-accommodating holes 13d, respectively. The front ends of the compression coil springs 25 protrude from the spring-accommodating holes 13d and abut against the rear end portion of the first telescoping barrel 14 (FIGS. 1 through 4). Each compression coil spring 25 is held in between the helicoid ring 13 and the first telescoping barrel 14 in a compressed state. The compression coil springs 25, in such a compressed state, bias the helicoid ring 13 rearward in the optical axis direction due to the resiliency of compression coil springs 25, and bias the first telescoping barrel 14 forward in the optical axis direction. Due to this biasing force of the compression coil springs 25, the male helicoidal threads 28 that are formed on the helicoid ring 13 are pressed against front lead surfaces of the female helicoidal threads 27, respectively, while the plurality of outer radial protrusions 29 that are formed on the first telescoping barrel 14 are pressed against rear lead surfaces of the female helicoidal threads 27, respectively.

Upon the helicoid ring 13 receiving a rotational force from the aforementioned zoom motor (not shown) via the aforementioned reduction gear train (not shown), the helicoid ring 13 moves in the optical axis direction while rotating due to the slide-engaging relationship between the female helicoid 27 and the male helicoid 28. During this movement, the helicoid ring 13 can move relative to the stationary barrel 12 without rattling since the male helicoid 28 presses against the female helicoid 27 in the optical axis direction due to the biasing force of the compression coil springs 25. Furthermore, the first telescoping barrel 14 moves together with the helicoid ring 13 in the optical axis direction while rotating due to the outer radial protrusions 29 being guided by the aforementioned rear lead surfaces of the female helicoidal threads 27 and pressing thereagainst due to the biasing force of the compression coil springs 25.

The first linear guide ring 15 is supported inside the helicoid ring 13 and the first telescoping barrel 14. The first linear guide ring 15 is linearly guided in the optical axis direction via three linear guide grooves 12a (see FIG. 5; only one of which is shown in FIG. 5) formed on the inner peripheral surface of the stationary barrel 12. The outer peripheral surface of the first linear guide ring 15 is provided with a plurality of outer projections 15a which are positioned at different positions in the circumferential direction and a corresponding plurality of outer projections 15b which are positioned at the same positions in the circumferential direction but at different positions with respect to the optical axis direction. A circumferential groove 15e is formed on the outer peripheral surface of the first linear guide ring 15 at a different position to those of the outer projections 15a and 15b with respect to the optical axis direction. The outer projections 15a engage with an inner circumferential groove 13e formed on the inner peripheral surface of the helicoid ring 13. The outer projections 15b engage with an inner circumferential groove 14c formed on the inner peripheral surface of the first telescoping barrel 14.

Inner projections 14e formed on the inner peripheral surface of the first telescoping barrel 14 are engaged with the circumferential groove 15e. Due to the engaging relationship of the outer projections 15a and 15b with the inner circumferential grooves 13e and 14c, respectively, and the engaging relationship of the circumferential groove 15e with the inner projections 14e, the first linear guide ring 15 moves in the optical axis direction together with the helicoid ring 13 and the first telescoping barrel 14.

Three guide through-slots 15c (see FIG. 5; only two of which are shown in FIG. 5) are formed in the first linear guide ring 15 and are formed completely through the first linear guide ring 15. Three followers 17a provided on the outer circumferential surface of the cam ring 17 are fitted into the three guide through-slots 15c, respectively, so as to be slidably movable therealong. Each of the guide through-slots 15c is provided with a lead groove portion 15c-L which extends diagonally with respect to the optical axis direction, and a circumferential groove portion 15c-S which extends circumferentially about the photographing optical axis ZP and orthogonal to the optical axis direction. The three followers 17a further extend radially so as to engage with three rotational-transfer grooves 14d, respectively, which are formed in the inner peripheral surface of the first telescoping barrel 14 and extend in the optical axis direction (see FIG. 5), so that the cam ring 17 rotates together with the first telescoping barrel 14. During this rotation of the cam ring 17, the cam ring 17 moves in the optical axis direction while rotating relative to the first linear guide ring 15 due to the engagement between the three followers 17a and the lead groove portions 15c-L of the three guide through-slots 15c when the three followers 17a are positioned in the lead groove portions 15c-L of the guide through-slots 15c, respectively.

The first linear guide ring 15 guides the second telescoping barrel 16 and the second linear guide ring 18 linearly in the optical axis direction via three linear grooves 15d which are formed in the inner peripheral surface of the first linear guide ring 15 and extend in the optical axis direction. The second telescoping barrel 16 is provided, on the outer peripheral surface in the vicinity of the rear end thereof, with three linear guide projections 16a (only one of which is shown in FIGS. 1 through 4) which project radially outwards to be slidably engaged in the three linear grooves 15d, respectively, and the second linear guide ring 18 is provided with three linear guide projections 18a (only one of which is shown in FIGS. 1 through 4) which are positioned behind the linear guide projections 16a in the optical axis direction and project radially outwards to be slidably engaged in the three linear grooves 15d, respectively. A plurality of rotation-guiding projections 16b (only one of which is shown in FIGS. 1 through 4) formed on the inner peripheral surface of the second telescoping barrel 16 in the vicinity of the rear end thereof are engaged in a circumferential groove 17b formed in the outer peripheral surface of the cam ring 17 to be freely slidable therein, and a plurality of rotation-guiding projections 18b (only one of which is shown in FIGS. 1 through 4) formed on the second linear guide ring 18 are engaged in a circumferential groove 17c formed in the inner peripheral surface of the cam ring 17 to be freely slidable therein. Due to the engagement of the rotation-guiding projections 16b with the circumferential groove 17b and the engagement of the rotation-guiding projections 18b with the circumferential groove 17c, the second telescoping barrel 16 and the second linear guide ring 18 are supported so as to each be relatively rotatable with respect to the cam ring 17 and to integrally move in the optical axis direction.

The second linear guide ring 18, which is supported by the rear end of the cam ring 17 via the plurality of rotation-guiding projections 18b, is provided with three linear guide keys 18c (only two of which are shown in FIG. 1) which are positioned radially inside the cam ring 17 and project forward. Each linear guide key 18c is provided on radially outer and inner surfaces thereof with outer and inner guide surfaces, respectively, which extend parallel to the photographing optical axis ZP. The third-lens-group support ring 19 is guided linearly in the optical axis direction by the outer and inner guide surfaces of each linear guide key 18c. As shown in FIGS. 10, 11, 13 and 15 through 18, the third-lens-group support ring 19 is provided with three partial cylindrical portions 19a at three different positions in the circumferential direction thereof. Each partial cylindrical portion 19a is provided thereon with a linear guide groove 19b so that the three linear guide keys 18c can fit into the three linear guide grooves 19b so as to be slidable therein in the optical axis direction, respectively. The third-lens-group support ring 19 is provided in between the three partial cylindrical portions 19a with three radially through-slot portions, so that the three partial cylindrical portions 19a and the three radially through-slot portions are alternately arranged in the circumferential direction of the third-lens-group support ring 19. The second-lens-group support ring 20 is provided with three partial cylindrical portions 20a (see FIGS. 6 through 8, and 15 through 21) which are fitted in the aforementioned radially through-slot portions so as to be relatively slidable on the three partial cylindrical portions 19a in the optical axis direction. The three partial cylindrical portions 20a are provided on outer peripheral surfaces thereof with three linear guide grooves 20d, respectively, which extend in the optical axis direction. Three linear guide keys (not shown) formed on the first-lens-group support barrel 21 are slidably engaged in the three linear guide grooves 20d, respectively. The first-lens-group support barrel 21 is prevented from rotating relative to the stationary barrel 12, and the second-lens-group support ring 20 is guided linearly in the optical axis direction via the first-lens-group support barrel 21.

The cam ring 17 is provided on the inner peripheral surface thereof with three first inner cam grooves 17m-2 for guiding the second lens group LG2 and three second inner cam grooves 17m-3 for guiding the third lens group LG3, and the second-lens-group support ring 20 is provided on the outer peripheral surface thereof with three first cam followers 20n for the second lens group LG2 and three second cam followers 19n for the third lens group LG3 which are engaged in the three first inner cam grooves 17m-2 and the three second inner cam grooves 17m-3, respectively. Since each of the third-lens-group support ring 19 and the second-lens-group support ring 20 is guided linearly in the optical axis direction, a rotation of the cam ring 17 causes each of the third-lens-group support ring 19 and the second-lens-group support ring 20 to move in the optical axis direction in a predetermined moving manner (zoom path) in accordance with the cam profiles of the first inner cam grooves 17m-2 and the second inner cam grooves 17m-3, respectively.

The second telescoping barrel 16, which is linearly guided in the optical axis direction by the first linear guide ring 15, guides the first-lens-group support barrel 21 linearly in the optical axis direction via linear grooves 16c which are formed on the inner peripheral surface of the second telescoping barrel 16. The first-lens-group support barrel 21 is provided with three first-lens-group cam followers 21n which project radially inwards (toward the optical axis). The three first-lens-group cam followers 21n are slidably engaged in three outer cam grooves 17m-1 formed on the outer circumferential surface of the cam ring 17. The first-lens-group adjusting ring 35 is positioned inside of the first-lens-group support barrel 21 to be supported thereby, and the first-lens-group frame 33 is positioned inside of the first-lens-group adjusting ring 35 to be supported thereby. The first-lens-group frame 33 holds the first lens group LG1.

The zoom lens barrel 11 is provided inside the second-lens-group support ring 20 with a first radially-retractable frame (radially-retractable optical element holding frame) 40. The first radially-retractable frame 40 holds the second-lens-group frame 39 which holds the second lens group LG2. The second-lens-group support ring 20 is provided with an inner flange portion 20b which connects the three partial cylindrical portions 20a to one another, and a shaft support portion 20c is formed on the inner flange portion 20b (see FIGS. 9 and 19 through 21). As shown in FIG. 9, a shaft support plate 42 is fixed to the second-lens-group support ring 20 to be positioned in front of the shaft support portion 20c, and a second-lens-group pivot shaft 41 is inserted into a shaft support hole formed in the shaft support portion 20c and the shaft support plate 42 to extend therethrough in the optical axis direction. The second-lens-group pivot shaft 41 is fixed to the shaft support portion 20c and the shaft support plate 42. The axial direction of the second-lens-group pivot shaft 41 thus fixed is substantially parallel to the photographing optical axis ZP. The first radially-retractable frame 40 is provided with a ring-shaped holder (holding frame portion) 40a which holds the second-lens-group frame 39 and a cylindrical bearing arm (shaft support portion) 40b which extends in a radial direction of the ring-shaped holder 40a. The cylindrical bearing arm 40b is provided in the vicinity of the radially outer end thereof with a bearing hole extending in the optical axis direction into which the second-lens-group pivot shaft 41 is fitted to be slidable on the cylindrical bearing arm 40b. With this structure, the first radially-retractable frame 40 is supported by the second-lens-group support ring 20 to be rotatable about the second-lens-group pivot shaft 41. More specifically, the first radially-retractable frame 40 can swing (rotates) about the second-lens-group pivot shaft 41 between a photographable position (first position; see FIGS. 1 through 3, 7, 8 and 15) at which the optical axis of the second lens group LG2 is coincident with the photographing optical axis ZP, and a radially retracted position (second position; see FIGS. 4 and 17) at which the optical axis of second lens group LG2 is retracted above the photographing optical axis ZP. The first radially-retractable frame 40 is biased toward the photographable position (i.e., counterclockwise as viewed from the front of the zoom lens barrel 11) by a second-lens-group frame biasing spring F1 the biasing direction of which is shown conceptually by an arrow in FIG. 8.

As shown in FIG. 9, the distance between the shaft support portion 20c on the second-lens-group support ring 20 and the shaft support plate 42 in the optical axis direction is slightly grater than the distance between the front and rear ends of the bearing arm 40b in the optical axis direction that is pivoted between the shaft support portion 20c and the shaft support plate 42. Accordingly, the bearing arm 40b of the first radially-retractable frame 40 is allowed to move forward and rearward slightly in the axial direction of the bearing arm 40b between the shaft support portion 20c and the shaft support plate 42, and is biased (rearward) in a direction to abut against the shaft support portion (stop portion) 20c by a rearward-biasing spring F2, the biasing direction of which is shown conceptually by an arrow in FIG. 9.

As shown in FIGS. 7, 8 and 19 through 21, the second-lens-group support ring 20 is provided with a rotation limit projection (positioning portion) 61 and an axial-direction-movement limit projection (optical-axis-direction-movement limit device) 62. The rotation limit projection 61 is in the shape of a cylindrical projection which projects forward from the inner flange portion 20b of the second-lens-group support ring 20. The axial-direction-movement limit projection 62 is a hook-shaped projection consisting of a forward-projecting portion 62a which projects forward from the inner flange portion 20b and an upright wall portion (wide free end) 62b which is bent inwards at a substantially right angle from a front end portion of the forward-projecting portion 62a so as to increase the thickness (width) of the axial-direction-movement limit projection 62 in a direction orthogonal to the photographing optical axis ZP. The upright wall portion 62b and the inner flange portion 20b are positioned apart from each other in the optical axis direction to face each other.

Figure 7:
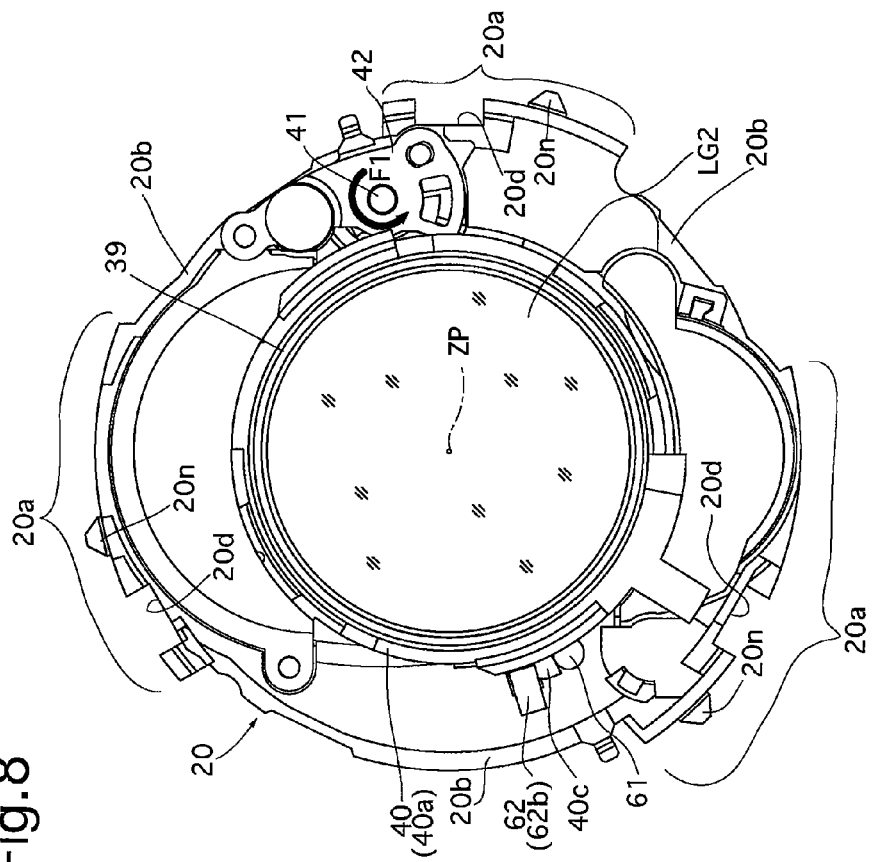
FIG. 7 is a perspective view of the second-lens-group support ring and the first radially-retractable frame supported by the second-lens-group support ring, viewed obliquely from below.
Figure 8:
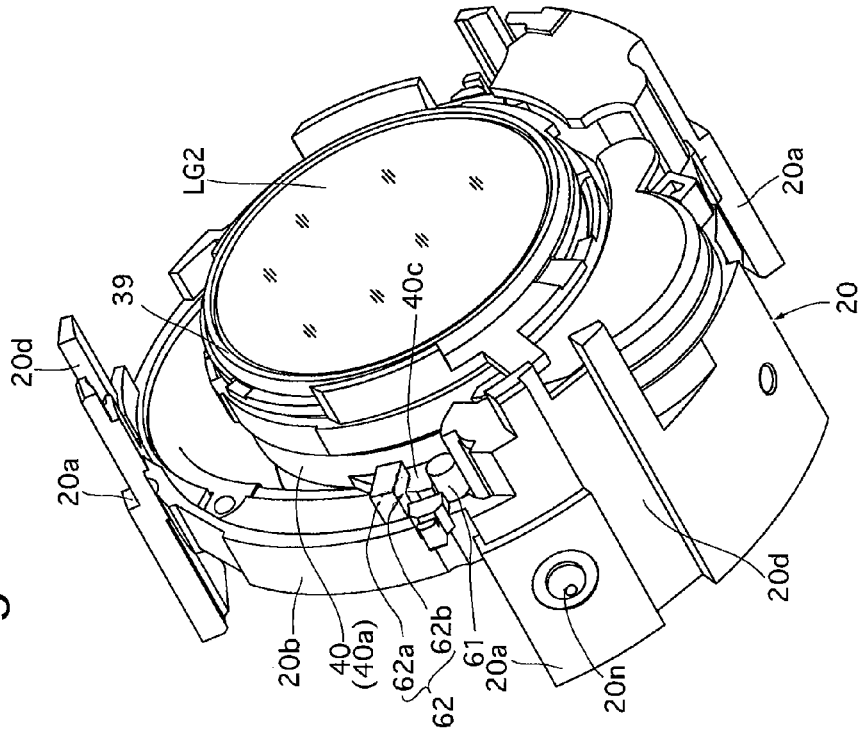
FIG. 8 is a front elevational view of the second-lens-group support ring and the first radially-retractable frame supported by the second-lens-group support ring when the first radially-retractable frame is in the photographable position thereof.
Figure 9:
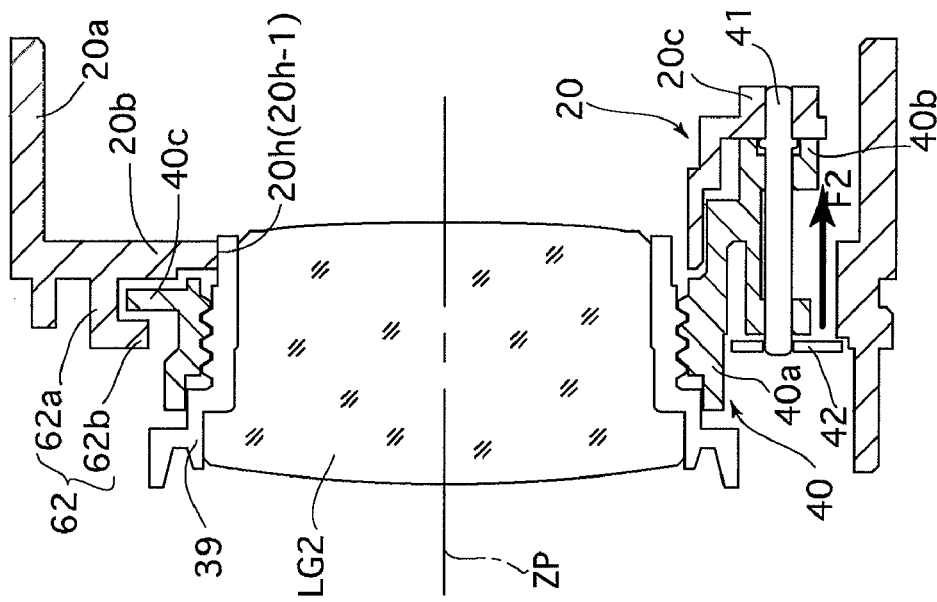
FIG. 9 is a cross sectional view of the second-lens-group frame, the first radially-retractable frame and the second-lens-group support ring, taken along a plane in which the axis of rotation of the first radially-retractable frame that holds the second lens group lies.
Figure 10:
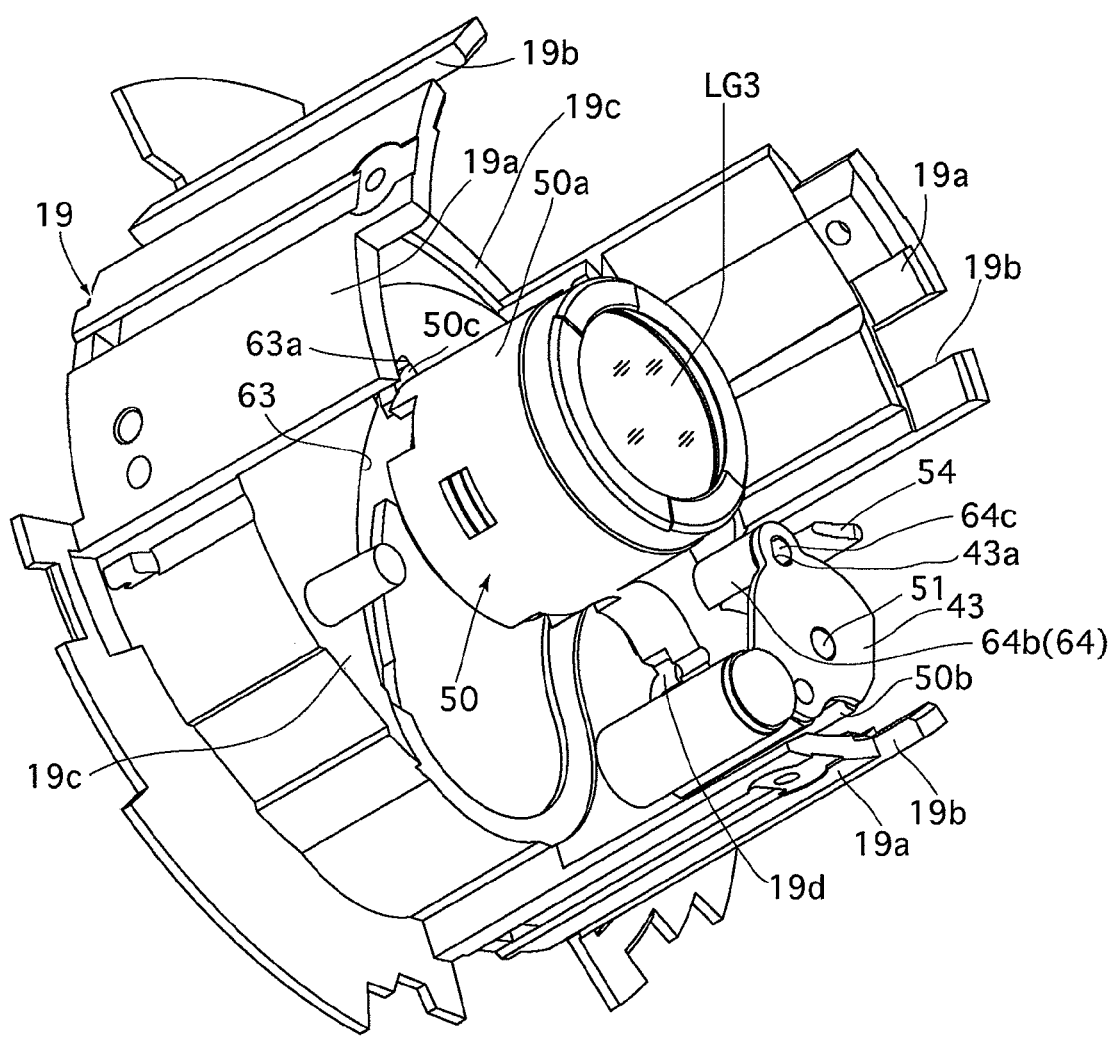
FIG. 10 is a perspective view of the third-lens-group support ring and a second radially-retractable frame supported by the third-lens-group support ring, viewed obliquely from below.
Figure 11:
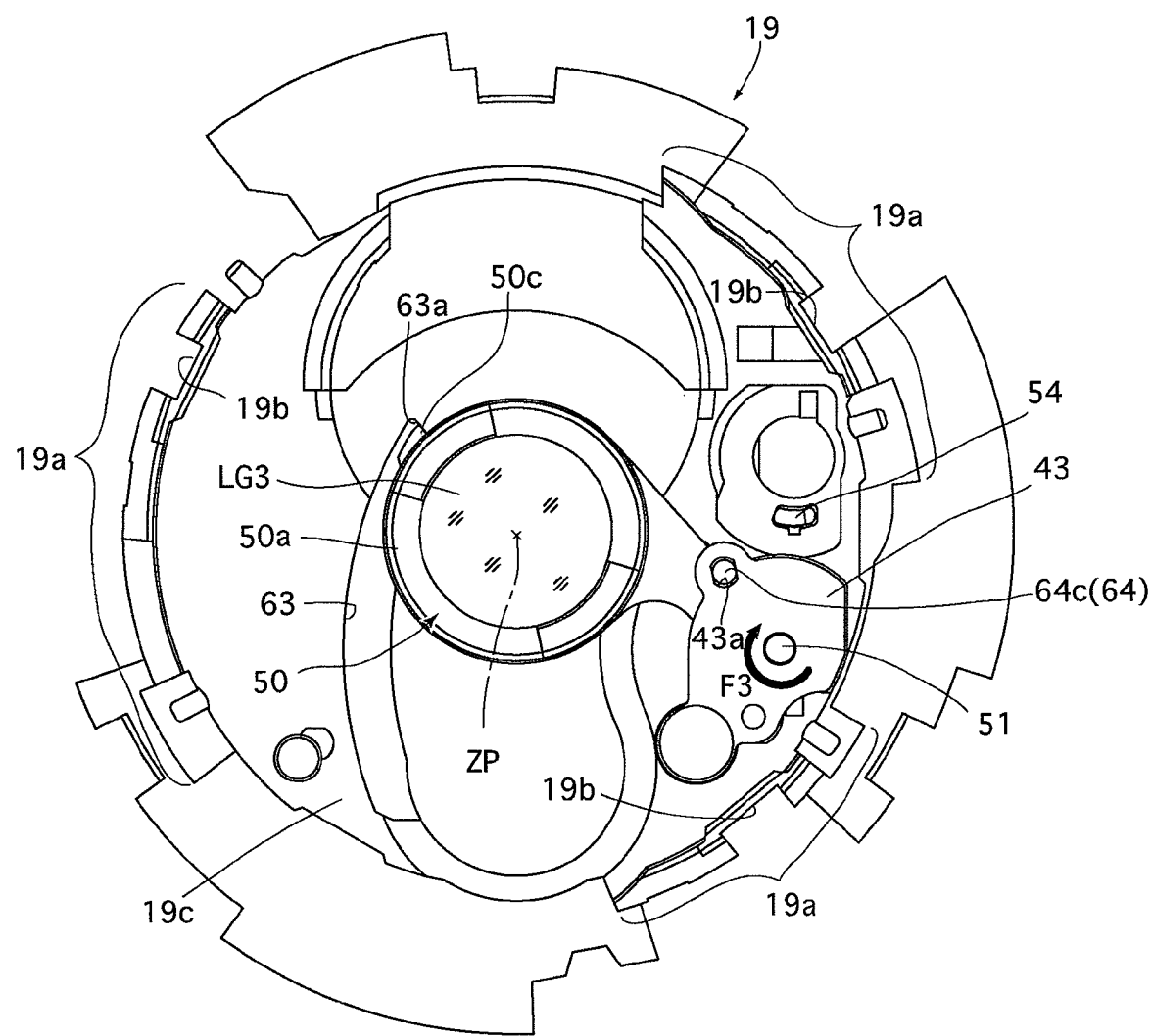
FIG. 11 is a front elevational view of the third-lens-group support ring and the second radially-retractable frame supported by the third-lens-group support ring when the second radially-retractable frame is in the photographable position thereof.
Figure 13:
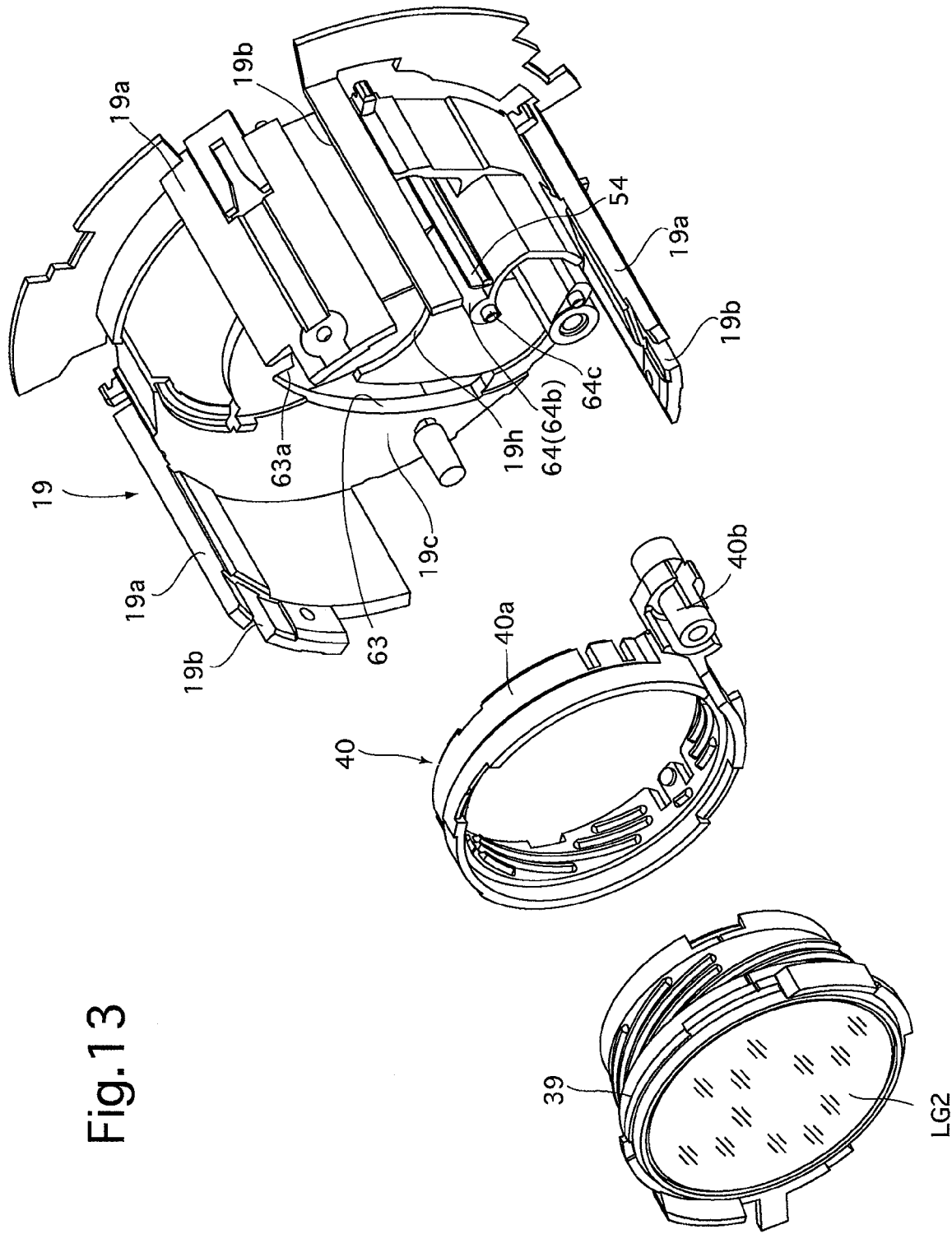
FIG. 13 is an exploded perspective view of a portion of the zoom lens barrel shown in FIG. 4, which includes the second-lens-group support frame, the first radially-retractable frame and the third-lens-group support ring, showing the outward appearance of a second-lens-group-retracting cam-bar formed integral with the third-lens-group support ring.

As shown in FIGS. 7 through 9, the first radially-retractable frame 40 is provided on the outer peripheral surface of the ring-shaped holder 40a with a rotation limit projection (outward projection) 40c engageable with the rotation limit projection 61. The rotation limit projection 40c is narrow in the circumferential direction of the ring-shaped holder 40a, and the limit of rotation of the first radially-retractable frame 40 in the biasing direction of the second-lens-group frame biasing spring F1 is determined by the engagement of the radially outer end of the rotation limit projection 40c with the outer peripheral surface of the rotation limit projection 61. Accordingly, when the second lens group LG2 is held in the photographable position by the engagement between the rotation limit projection 40c and the rotation limit projection 61, the rotation limit projection 40c further engages with the axial-direction-movement limit projection 62 so that the first radially-retractable frame 40 (the second lens group LG2) is held with stability.

More specifically, as shown in FIG. 9, upon coming into contact with the rotation limit projection 61, the rotation limit projection 40c partly enters the space between the upright wall portion 62b of the axial-direction-movement limit projection 62 and the inner flange portion 20b (U-shaped space surrounded by the forward-projecting portion 62a, the upright wall portion 62b and the inner flange portion 20b) so that front and rear surfaces of the rotation limit projection 40c face the upright wall portion 62b and the inner flange portion 20b, respectively. Therefore, the upright wall portion 62b and the inner flange portion 20b, which are positioned on opposite sides (front and rear sides) of the rotation limit projection 40c, limit the forward/rearward movement of the first radially-retractable frame 40 (movement of the first radially-retractable frame 40 in the optical axis direction) relative to the second-lens-group support ring 20 to prevent the first radially-retractable frame 40 from deviating from the proper position in the forward/rearward direction (optical axis direction) when the first radially-retractable frame 40 is in the photographable position. Specifically, although the rotation limit projection 61 is a cantilever-like projection, the front end of which is provided as a free end (non-fixed end), there is no possibility of the first radially-retractable frame 40 thrusting forward to cause the rotation limit projection 40c to override the front end of the rotation limit projection 61 because the upright wall portion 62b of the axial-direction-movement limit projection 62 blocks the front of the rotation limit projection 40c. Therefore, even if an external impactive force is applied to the zoom lens barrel 11 in a photographable state upon the camera being accidentally dropped to the ground or the like, a malfunction of the first radially-retractable frame 40 (e.g., an excessive thrusting forward movement of the first radially-retractable frame 40 beyond the limit of forward movement thereof at which the rotation limit projection 40c comes into contact with the rotation limit projection 61) can be prevented from occurring.

Figure 12:
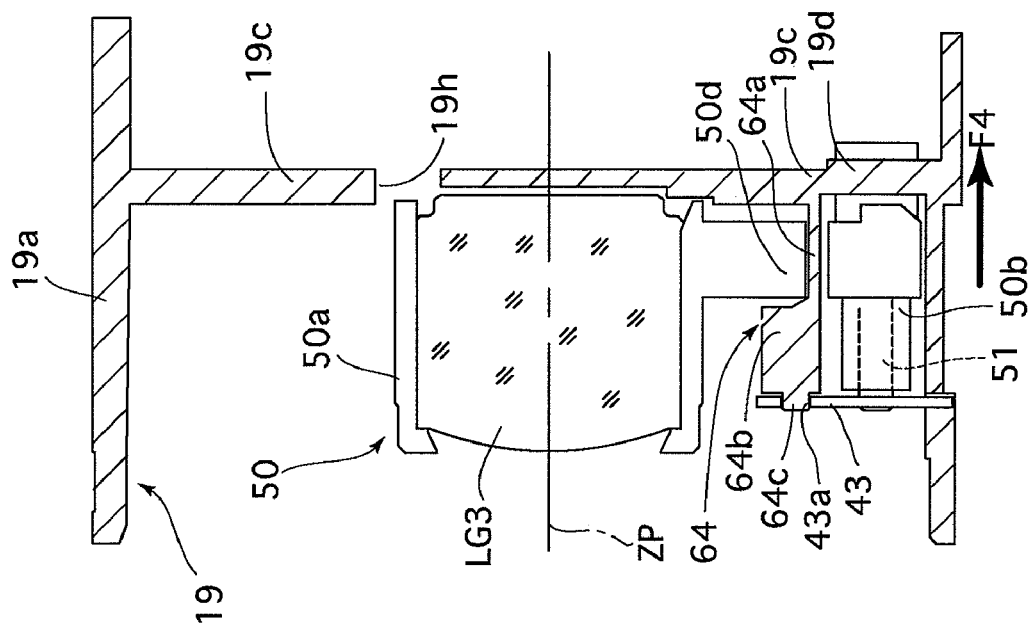
FIG. 12 is a cross sectional view of the third-lens-group frame, the second radially-retractable frame and the third-lens-group support ring, taken along a plane in which the axis of rotation of the second radially-retractable frame that holds the third lens group lies.

The zoom lens barrel 11 is provided inside the third-lens-group support ring 19 with a second radially-retractable frame (radially-retractable optical element holding frame) 50 which holds the third lens group LG3. The third-lens-group support ring 19 is provided with an inner flange portion 19c which connects the three partial cylindrical portions 19a to one another, and a shaft support portion 19d (see FIG. 12) is formed on the inner flange portion 19c. As shown in FIG. 12, a shaft support plate 43 is fixed to the third-lens-group support ring 19 to be positioned in front of the shaft support portion 19d, and a third-lens-group pivot shaft 51 is inserted into a shaft support hole formed in the shaft support portion 19d and the shaft support plate 43 to extend therethrough in the optical axis direction. The third-lens-group pivot shaft 51 is fixed to the shaft support portion 19d and the shaft support plate 43. The axial direction of the third-lens-group pivot shaft 51 thus fixed is substantially parallel to the photographing optical axis ZP. The second radially-retractable frame 50 is provided with a ring-shaped holder (holding frame portion) 50a which holds the third lens group LG3 and a cylindrical bearing arm (shaft support portion) 50b which extends in a radial direction of the ring-shaped holder 50a. The cylindrical bearing arm 50b is provided in the vicinity of the radially outer end thereof with a bearing hole extending in the optical axis direction, into which the third-lens-group pivot shaft 51 is fitted to be slidable on the cylindrical bearing arm 50b. With this structure, the second radially-retractable frame 50 is supported by the third-lens-group support ring 19 to be rotatable about the third-lens-group pivot shaft 51. More specifically, the second radially-retractable frame 50 can swing (rotate) about the third-lens-group pivot shaft 51 between a photographable position (first position; see FIGS. 1 through 3, 10, 11, 15 and 16) at which the optical axis of the third lens group LG3 is coincident with the photographing optical axis ZP, and a radially retracted position (second position; see FIGS. 4, 17 and 20) at which the optical axis of the third lens group LG3 is retracted below the photographing optical axis ZP. The second radially-retractable frame 50 is biased toward the photographable position (i.e., clockwise as viewed from the front of the zoom lens barrel 11) by a third-lens-group frame biasing spring F3 the biasing direction of which is shown conceptually by an arrow in FIG. 11.

As shown in FIG. 12, the distance between the shaft support portion 19d on the third-lens-group support ring 19 and the shaft support plate 43 in the optical axis direction is slightly greater than the distance between the front and rear ends of the bearing arm 50b, in the optical axis direction, that is pivoted between the shaft support portion 19d and the shaft support plate 43. Accordingly, the bearing arm 50b of the second radially-retractable frame 50 is allowed to move forward and rearward slightly in the optical axis direction between the shaft support portion 19d and the shaft support plate 43, and is biased (rearward) in a direction to abut against the shaft support portion (stop portion) 19d by a rearward-biasing spring F4, the biasing direction of which is shown conceptually by an arrow in FIG. 12.

As shown in FIGS. 6, 10 through 13, 15 and 16, the third-lens-group support ring 19 is provided with an arc-shaped through hole 63 and an axial-direction-movement limit projection (optical-axis-direction-movement limit device) 64. The arc-shaped through hole 63 is formed through the inner flange portion 19c and elongated in a plane orthogonal to the optical axis direction. The inner flange portion 19c is provided at one end (upper end) of the arc-shaped through hole 63 with a rotation limit surface (positioning portion) 63a. As shown in FIG. 12, the axial-direction-movement limit projection 64 is shaped as a projection having a wide end portion at the front end thereof. More specifically, the axial-direction-movement limit projection 64 consists of a forward-projecting portion 64a which projects forward from the inner flange portion 19c in the optical axis direction and a wide upright wall portion (wide free end) 64b which is formed continuously with the front end of the forward-projecting portion 64a so as to increase the thickness (width) of the axial-direction-movement limit projection 64 in a direction orthogonal to the photographing optical axis ZP. An upright wall surface forming a stepped portion which faces the inner flange portion 19c is provided between the forward-projecting portion 64a and the wide upright wall portion 64b. The wide upright wall portion 64b is provided at the front end thereof with a positioning pin 64c which is engaged in a positioning hole 43a formed through the shaft support plate 43 (see FIGS. 10 through 12).

Figure 6:
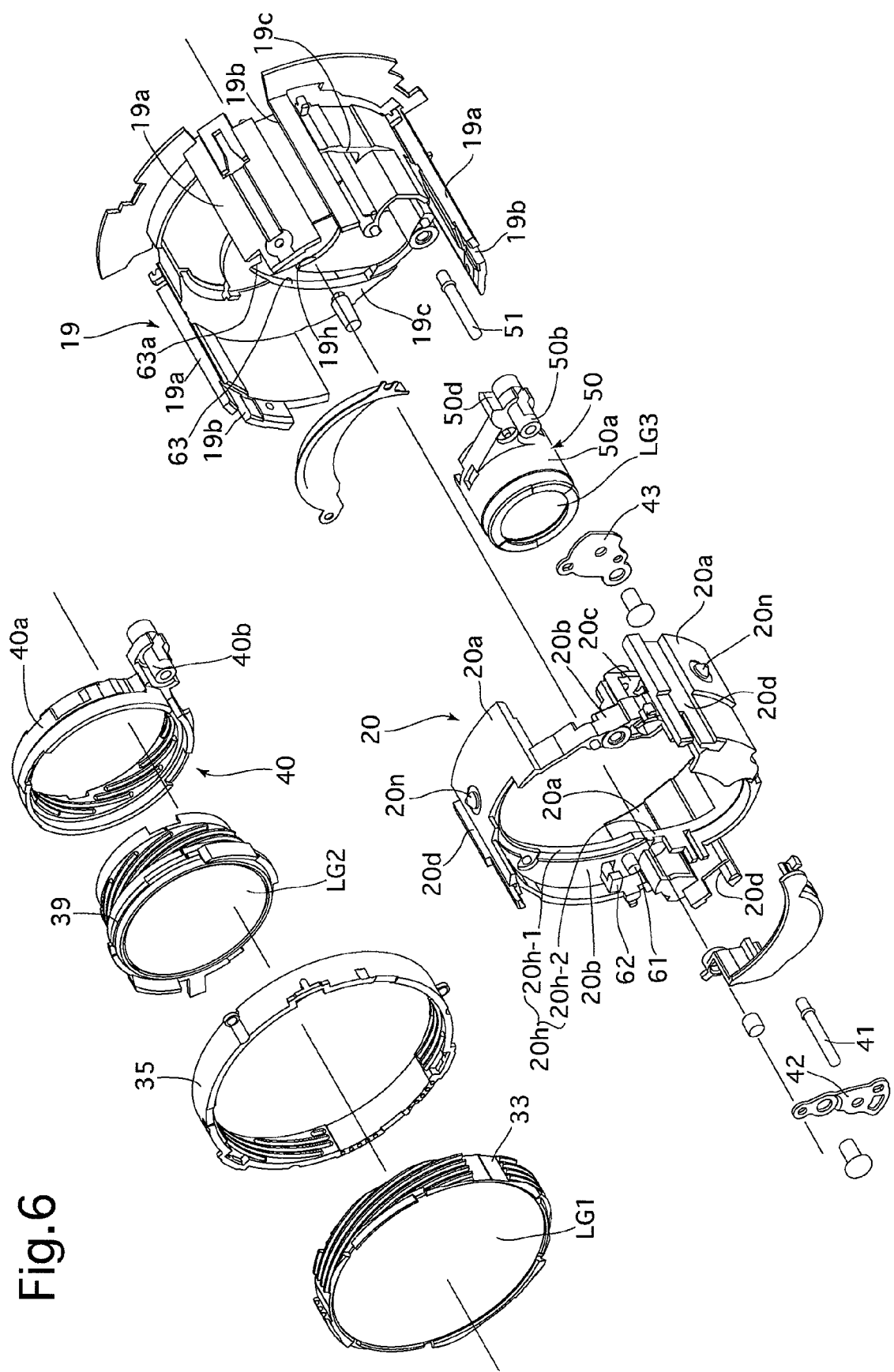
FIG. 6 is an exploded perspective view of another portion of the zoom lens barrel shown in FIG. 4 which includes a first-lens-group frame, a first-lens-group adjusting ring, a second-lens-group frame, a first radially-retractable frame, a second-lens-group support ring, a third-lens-group frame and a third-lens-group support ring.
Figure 20:
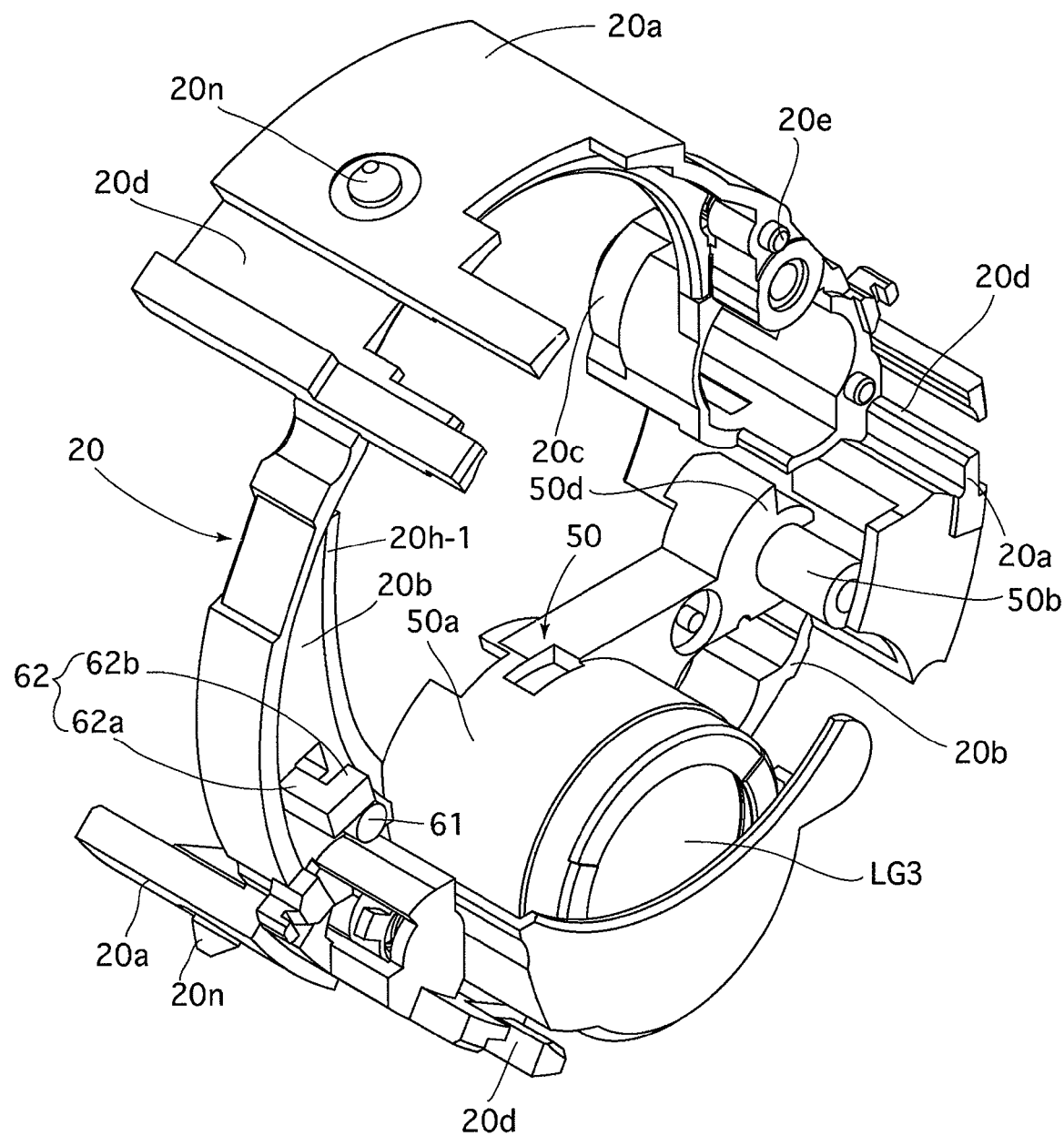
FIG. 20 is an enlarged perspective view of the second-lens-group support frame and the second radially-retractable frame, viewed from an angle different from the angle of FIG. 19, showing a state where the cylindrical lens holder portion of the second radially-retractable frame is inserted into a third-lens-group insertable opening formed through the second-lens-group support frame.

As shown in FIGS. 10 and 11, 14 through 16, the second radially-retractable frame 50 is provided, on the outer peripheral surface of the ring-shaped holder 50a at the rear end thereof, with a rotation limit projection 50c. The rotation limit projection 50c is inserted into the arc-shaped through hole 63, that is formed through the third-lens-group support ring 19, and moves in the arc-shaped through hole 63 in accordance with rotational movements of the second radially-retractable frame 50. The limit of rotation of the second radially-retractable frame 50 in the biasing direction of the third-lens-group frame biasing spring F3 is determined by the engagement of the rotation limit projection 50c with the rotation limit surface 63a. Namely, the rotation limit projection 50c and the rotation limit surface 63a serve as a positioning device for determining the photographable position of the third lens group LG3. Additionally, as shown in FIGS. 6, 14 and 20, the cylindrical bearing arm 50b of the second radially-retractable frame 50 is provided on the outer peripheral surface thereof with an axial-direction-movement limit projection (outward projection) 50d engageable with the axial-direction-movement limit projection 64. The axial-direction-movement limit projection 50d is formed as a projection (large-diameter portion) which projects outwardly in a radial direction about the third-lens-group pivot shaft 51. When the third lens group LG3 is held in the photographable position by the engagement of the rotation limit projection 50c with the rotation limit surface 63a, the rotation limit projection 50d further engages with the axial-direction-movement limit projection 64 so that the second radially-retractable frame 50 (the third lens group LG3) is held with stability.

More specifically, as shown in FIG. 12, upon the rotation limit projection 50c and the rotation limit surface 63a coming into contact with each other, the axial-direction-movement limit projection 50d enters the space between the wide upright wall portion 64b and the inner flange portion 19c (U-shaped space surrounded by the forward-projecting portion 64a, the wide upright wall portion 64b and the inner flange portion 19c) so that front and rear surfaces of the axial-direction-movement limit projection 50d face the wide upright wall portion 64b (the aforementioned upright wall surface between the wide upright wall portion 64b and the forward-projecting portion 64a) and the inner flange portion 19c, respectively. Therefore, the wide upright wall portion 64b and the inner flange portion 19c, which are positioned on opposite sides (front and rear sides) of the axial-direction-movement limit projection 50d, limit the forward/rearward movement of the second radially-retractable frame 50 (movement of the second radially-retractable frame 50 in the optical axis direction) to prevent the second radially-retractable frame 50 from deviating from the proper position in the forward/rearward direction (optical axis direction) when the second radially-retractable frame 50 is in the photographable position. Specifically, there is no possibility of the second radially-retractable frame 50 thrusting forward to cause the rotation limit projection 50c thereof to overpass the point of contact between the rotation limit projection 50c and the rotation limit surface 63a and come off forward from this point of engagement, because the wide upright wall portion 64b of the axial-direction-movement limit projection 64 stops the front of the axial-direction-movement limit projection 50d. Therefore, even if an external impactive force is applied to the zoom lens barrel 11 in a photographable state upon the camera being accidentally dropped to the ground or the like, a malfunction of the second radially-retractable frame 50 (e.g., an excessive thrusting forward movement of the second radially-retractable frame 50 beyond the limit of forward movement thereof at which the rotation limit projection 50c comes into contact with the rotation limit surface 63a) can be prevented from occurring.

As shown in FIGS. 10, 13 and 15 through 18, the third-lens-group support ring 19 is provided with a second-lens-group-retracting cam-bar 54 which extends in a forward direction parallel to the photographing optical axis ZP, and as shown in FIG. 14, the stationary CCD holder 23 is provided with a third-lens-group-retracting cam-bar 55 which extends in a forward direction in the optical axis direction. Upon the second-lens-group support ring 20 and the third-lens-group support ring 19 mutually approaching each other so that the distance therebetween becomes smaller than a predetermined distance, the second-lens-group-retracting cam-bar 54, which is provided on the third-lens-group support ring 19, abuts against the cylindrical bearing arm 40b of the first radially-retractable frame 40 so that the first radially-retractable frame 40 radially retracts while swinging upward to the radially-retracted position from the photographable position against the biasing force of the second-lens-group frame biasing spring F1 in accordance with a cam profile provided at the front end of the second-lens-group-retracting cam-bar 54 (see FIG. 17). Similarly, upon the second-lens-group support ring 20 and the third-lens-group support ring 19 mutually approaching each other so that the distance therebetween becomes smaller than a predetermined distance, the third-lens-group-retracting cam-bar 55 that is provided on the stationary CCD holder 23 abuts against the third-lens-group frame 50, so that the third-lens-group frame 50 radially retracts while swinging downward to the radially-retracted position from the photographable position against the biasing force of the third-lens-group frame biasing spring F3 in accordance with a cam profile provided at the front end of on the third-lens-group-retracting cam-bar 55.

Figure 19:
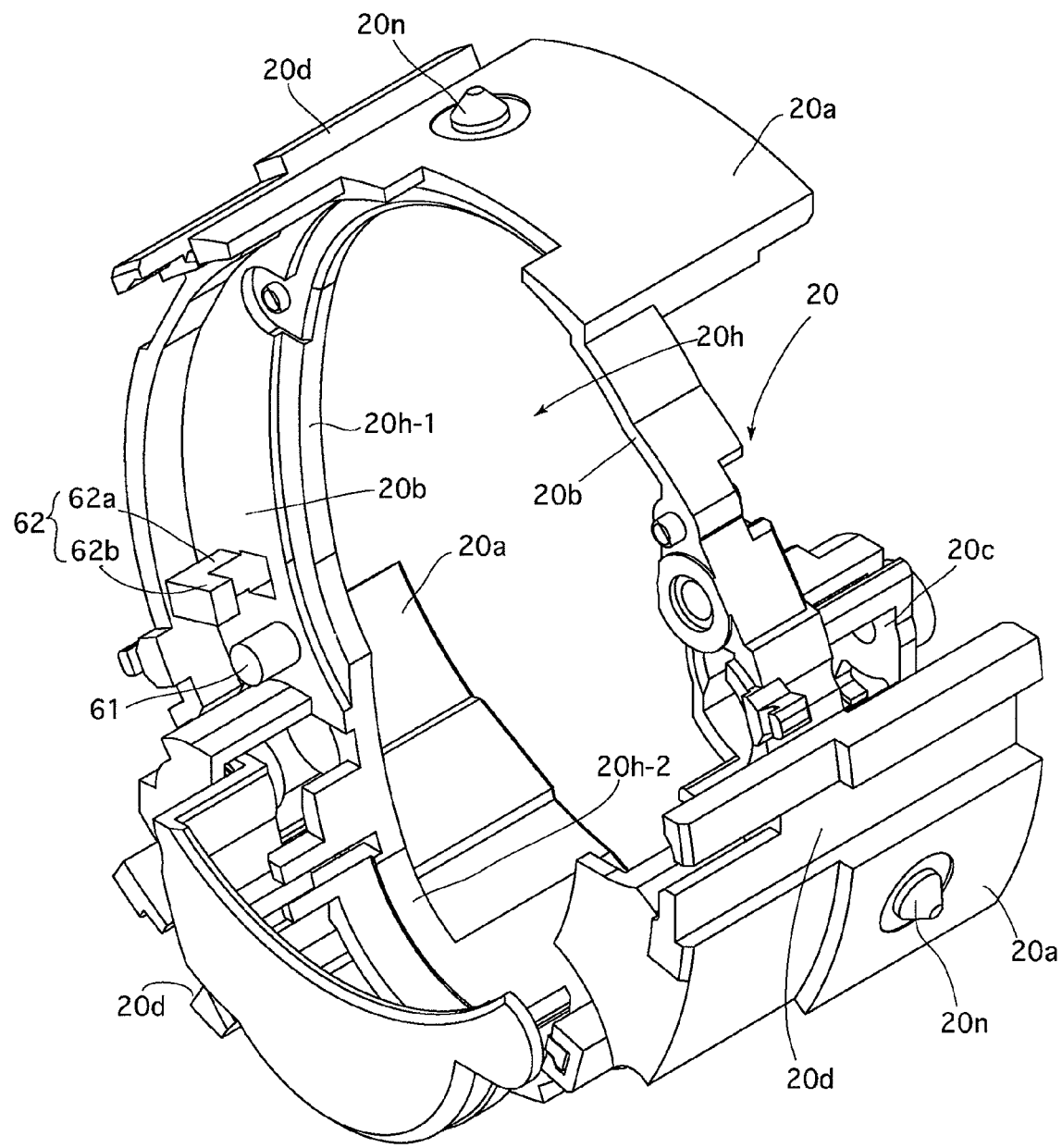
FIG. 19 is an enlarged perspective view of the second-lens-group support frame.
Figure 21:
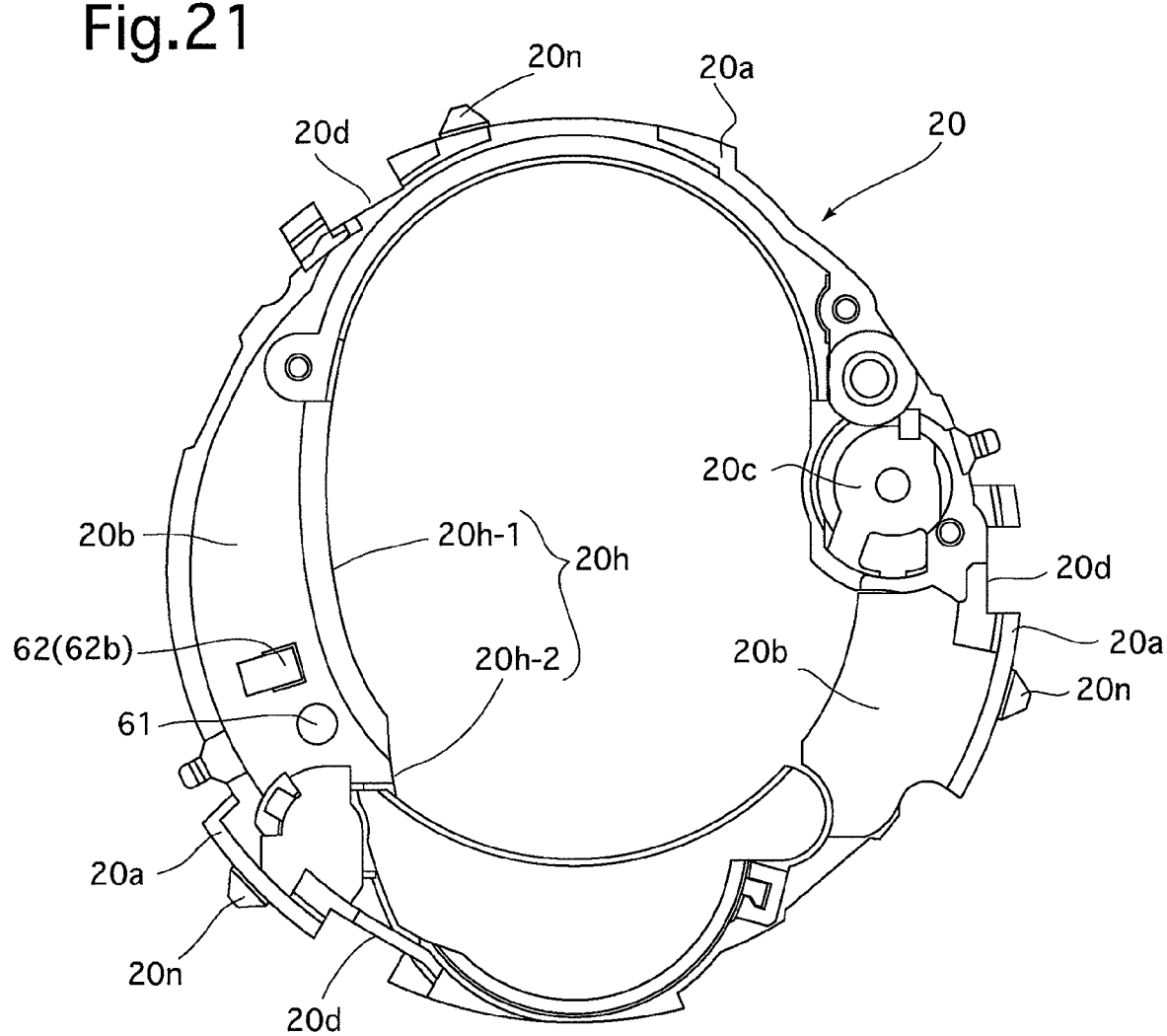
FIG. 21 is a front elevational view of the second-lens-group support frame.

The second-lens-group support ring 20 is provided in the center of the inner flange portion 20b with a through hole 20h which extends therethrough in the optical axis direction. As shown in FIGS. 19 through 21, the through hole 20h includes a second-lens-group moving hole 20h-1 which is formed upward from a point through which the photographing optical axis ZP passes, and a third-lens-group moving hole 20h-2 which is formed below the second-lens-group moving hole 20h-1 to be communicatively connected thereto and smaller in width than the second-lens-group moving hole 20h-1. The ring-shaped holder 40a of the first radially-retractable frame 40 enters the second-lens-group moving hole 20h-1. The ring-shaped holder 40a moves in the second-lens-group moving hole 20h-1 when the first radially-retractable frame 40 swings between the photographable position and the radially retracted position above the photographable position. The third-lens-group moving hole 20h-2 is formed to have a width (diameter) allowing the ring-shaped holder 50a of the second radially-retractable frame 50 to enter the third-lens-group moving hole 20h-2.

The third-lens-group support ring 19 is provided in the center of the inner flange portion 19c with a circular through hole 19h which surrounds the photographing optical axis ZP. The through hole 19h is positioned behind the ring-shaped holder 50a (the third lens group LG3) to allow a photographic light bundle to pass therethrough when the second radially-retractable frame 50 is positioned in the aforementioned photographable position.

Figure 17:
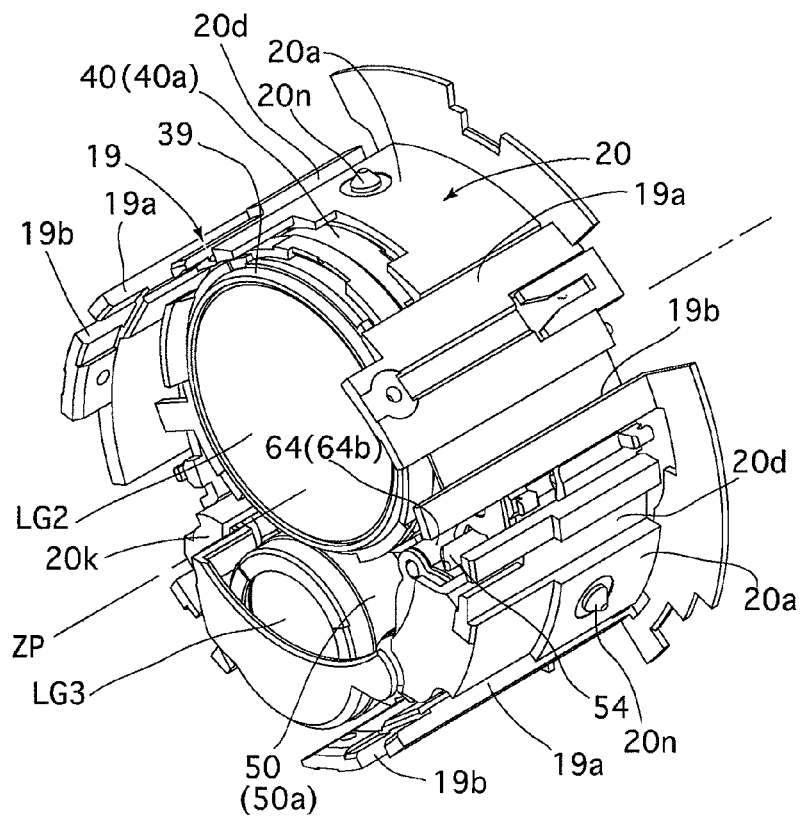
FIG. 17 is a perspective view of the second-lens-group support frame and the third-lens-group support ring, showing the relative position therebetween in the accommodation state of the zoom lens barrel.

The zoom lens barrel 11 having the above described structure operates in the following described manner. FIG. 17 shows the relative position between the second-lens-group support frame 20 and the third-lens-group support ring 19 and the relative position between the first radially-retractable frame 40 (the second lens group LG2) and the second radially-retractable frame 50 (the third lens group LG3) in the accommodation state of the zoom lens barrel 11 shown in FIG. 4. As can be seen from FIG. 4, in the accommodation state of the zoom lens barrel 11, the second-lens-group support frame 20 and the third-lens-group support ring 19 are positioned close to each other and the amount of overlap between the three partial cylindrical portions 19a and the three partial cylindrical portions 20a in the optical axis direction is at a maximum. Therefore, the first radially-retractable frame 40 in the second-lens-group support frame 20 has been retracted upward to the radially-retracted position by being pressed by the second-lens-group-retracting cam-bar 54 that is provided on the third-lens-group support ring 19. At the same time, the third-lens-group support ring 19 is positioned close to the stationary CCD holder 23 while the second radially-retractable frame 50 in the third-lens-group support frame 19 has been retracted downward to the radially-retracted position by being pressed by the third-lens-group-retracting cam-bar 55 that is provided on the stationary CCD holder 23. At this time, in accordance with the movements of the second-lens-group support frame 20 and the third-lens-group support ring 19 which approach each other, the ring-shaped holder 50a of the second radially-retractable frame 50 enters the third-lens-group moving hole 20h-2 (accommodation space), and the second lens group LG2 and the third lens group LG3 are accommodated in a state where the second lens group LG2 and the third lens group LG3 are positioned side by side in the vertical direction as shown in FIGS. 4 and 17, which reduces the length of the zoom lens barrel 11 in the optical axis direction in the accommodation state of the zoom lens barrel 11.

Figure 4:
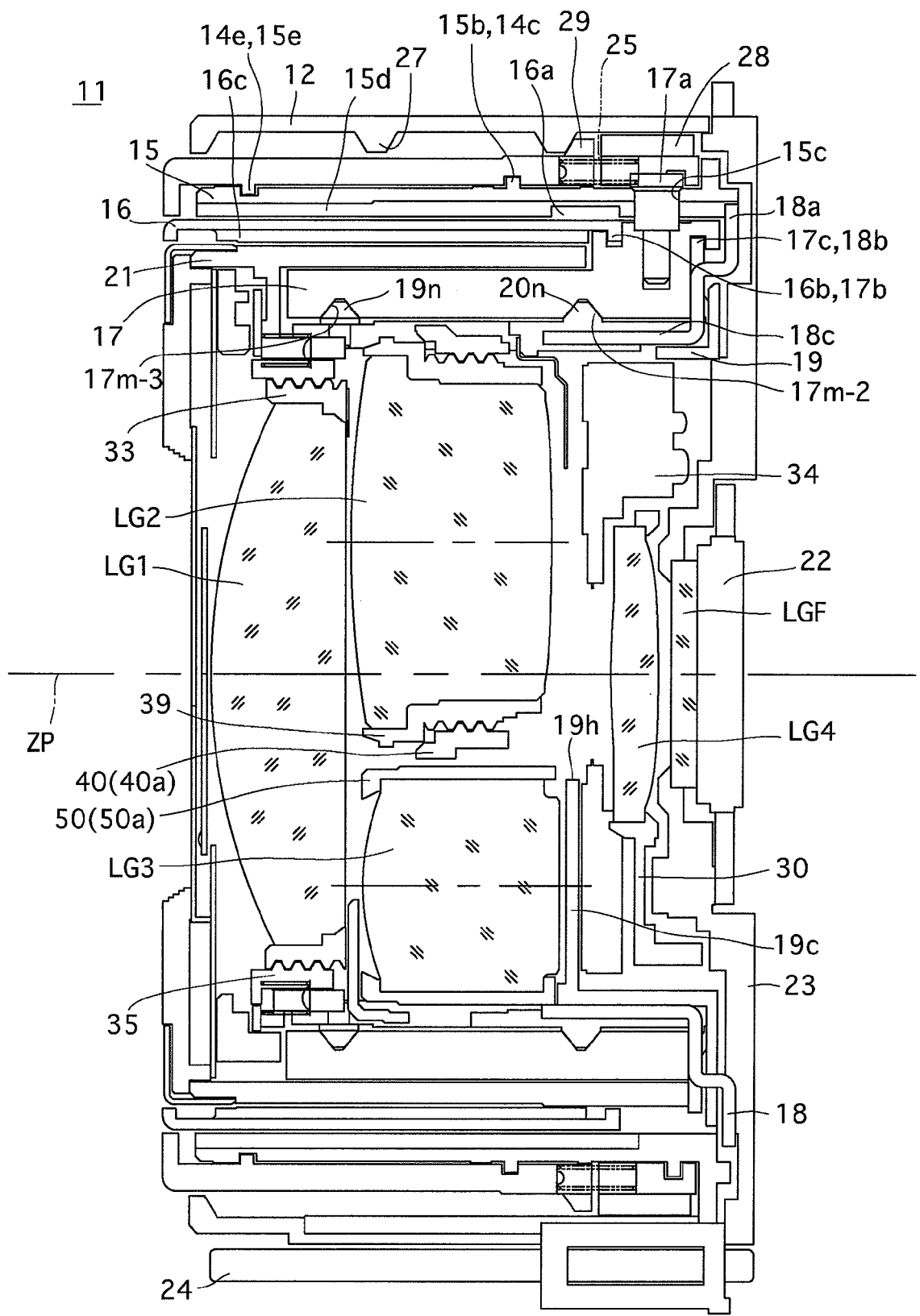
FIG. 4 is a longitudinal sectional view of the zoom lens barrel in an accommodation state, according to the present invention.
Figure 18:
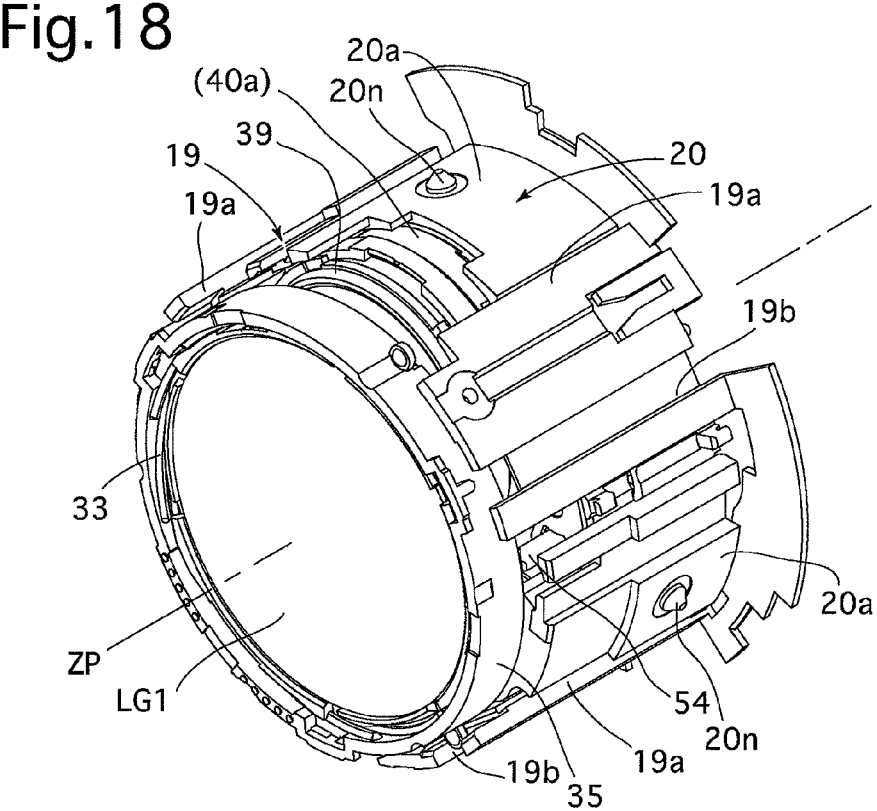
FIG. 18 is a perspective view of the elements shown in FIG. 17, the first-lens-group frame and the first-lens-group adjusting ring in the accommodation state of the lens barrel.

Additionally, in the accommodation state of the zoom lens barrel 11, the first-lens-group frame 33 has been moved back to a point where the first-lens-group frame 33 partly enters the front end portion of the third-lens-group support ring 19 so that the first lens group LG1 is accommodated to be positioned immediately in front of the second lens group LG2 and the third lens group LG3 so as to be adjacent thereto as shown in FIGS. 4 and 18. The diameter of the first lens group LG1 is substantially equal to the sum of the diameters of the second lens group LG2 and the third lens group LG3 which are overlaid on each other in the vertical direction, and the first lens group LG1 occupies a space immediately in front of the second lens group LG2 and the third lens group LG3 in the accommodation state of the zoom lens barrel 11, so that the first lens group LG1 is accommodated in a space-saving manner. In addition, in the accommodation state of the zoom lens barrel 11, the fourth-lens-group frame 30 that holds the fourth lens group LG4 has been fully retracted to the limit of rearward movement thereof on the CCD 22 side (see FIG. 4).

In the accommodation state of the zoom lens barrel 11, upon a main switch (not shown) being turned ON, the zoom motor is driven in a forward direction (lens-barrel advancing direction). This forward direction of the zoom motor causes the helicoid ring 13 to move forward while rotating in accordance with the screw-engagement relationship between the female helicoid 27 and the male helicoid 28. Due to the engagement of the rotational-transfer recesses 13b with the rotational-transfer projections 14a, the first telescoping barrel 14, which is connected to the helicoid ring 13, moves forward while rotating together with the helicoid ring 13 while the outer radial protrusions 29 are guided by the female helicoid 27. The first linear guide ring 15 linearly moves forward together with the helicoid ring 13 and the first telescoping barrel 14. Furthermore, the cam ring 17, to which a rotational force from the first telescoping barrel 14 is given, also moves forward. The amount of this forward movement of the cam ring 17 corresponds to the sum of the amount of forward movement of the first linear guide ring 15, and the amount of forward movement of the cam ring 17 relative to the first linear guide ring 15 due to the engagement between the three followers 17a and the lead groove portions 15c-L of the three guide through-slots 15c.

When the cam ring 17 moves forward, the third-lens-group support ring 19 that is supported by the cam ring 17 also moves forward. Thereafter, at a mid-position during this forward movement of the third lens group support ring 19 to a position in the zooming range thereof, the second radially-retractable frame 50, which has retracted the third lens group LG3 downward to the radially-retracted position in the accommodation state of the zoom lens barrel 11, is disengaged from the third-lens-group-retracting cam-bar 55 and rotates about the third-lens-group pivot shaft 51 to the photographable position (see FIGS. 15 and 16), in which the optical axis of the third lens group LG3 coincides with the photographing optical axis ZP, by the biasing force of the third-lens-group frame biasing spring F3. At this time, the rotation limit projection 50c comes in contact with the rotation limit surface 63a of the third lens group support ring 19, which determines the limit of rotation of the second radially-retractable frame 50 (i.e., the photographable position of the second radially-retractable frame 50) in the biasing direction of the third-lens-group frame biasing spring F3, while the rotation limit projection 50d engages with the axial-direction-movement limit projection 64 of the third lens group support ring 19 to limit the forward/rearward movement of the second radially-retractable frame 50 in the third lens group support ring 19. From that time onward, the second radially-retractable frame 50 remains held in the photographable position until the zoom lens barrel 11 is fully retracted again.

Figure 15:
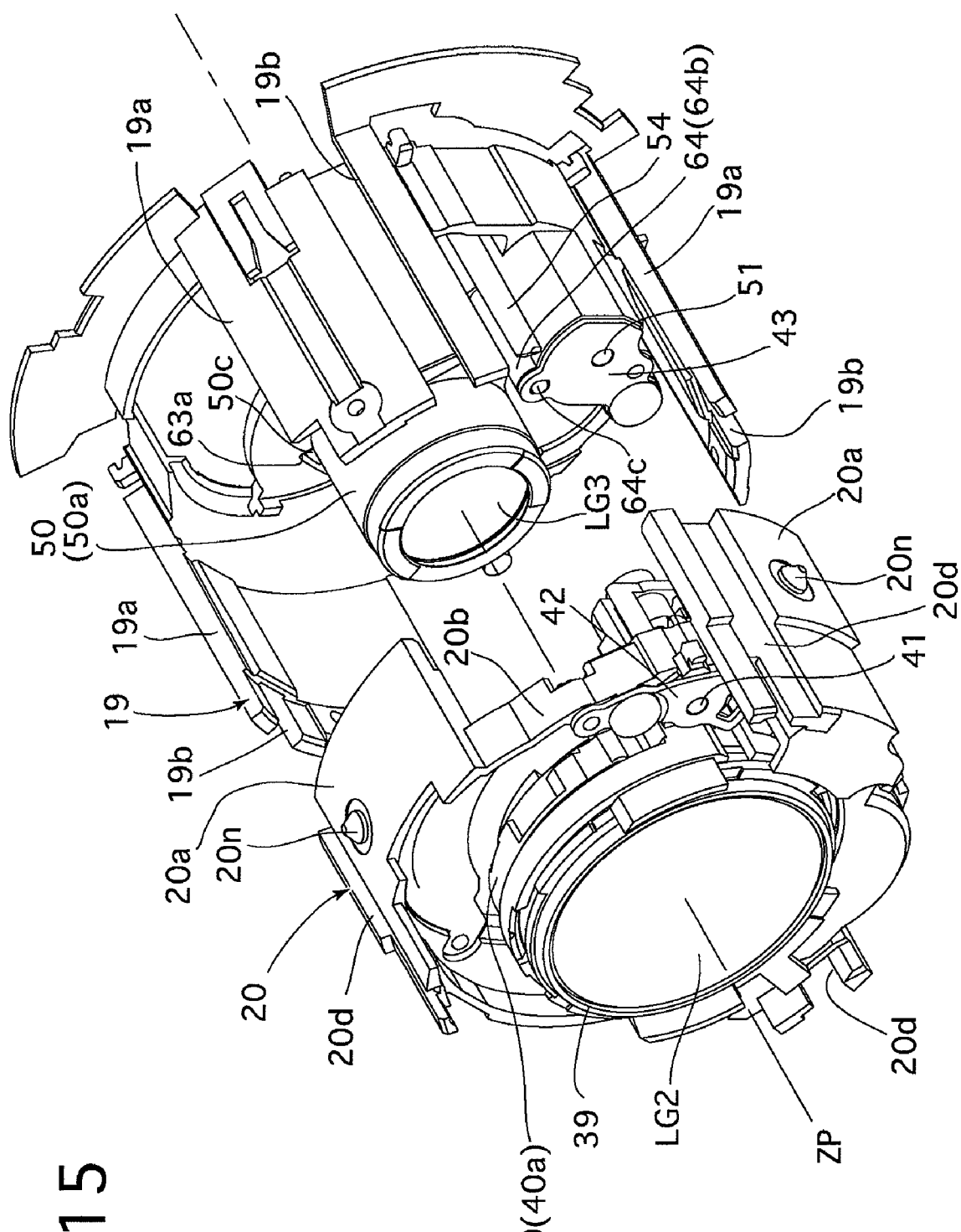
FIG. 15 is a perspective view of the second-lens-group support frame, the third-lens-group support ring and associated elements thereof, showing the relative position between the second-lens-group support frame and the third-lens-group support ring in a photographable state at the wide-angle extremity.
Figure 16:
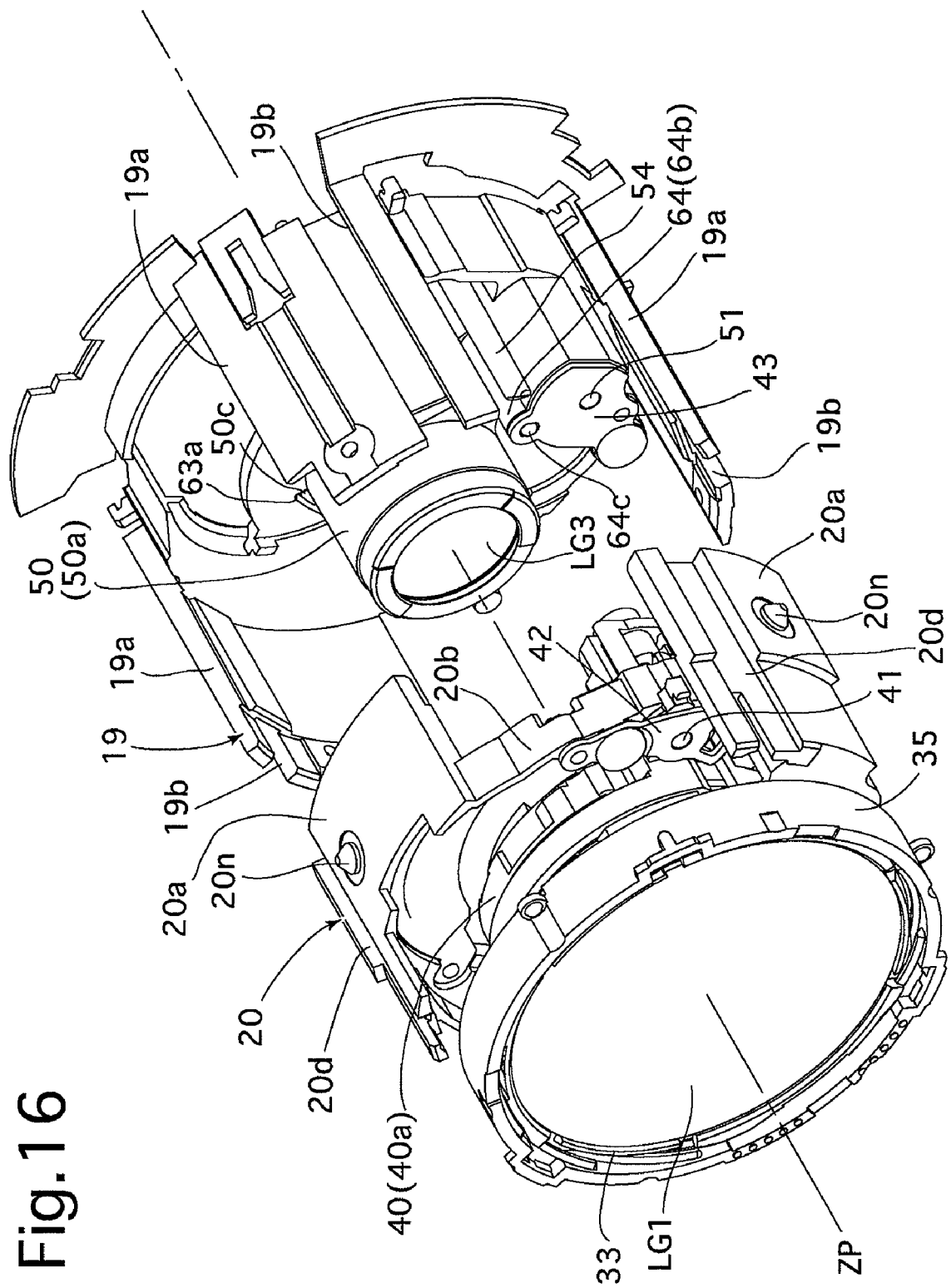
FIG. 16 is a perspective view of the elements shown in FIG. 15, the first-lens-group frame and the first-lens-group adjusting ring in a photographable state at the wide-angle extremity.

Upon the cam ring 17 rotating by an advancing movement of the zoom lens barrel 11, the second-lens-group support ring 20 and the third-lens-group support ring 19, which are guided linearly in the optical axis direction, are moved inside the cam ring 17 in accordance with a predetermined zoom path via the engaging relationship between the first inner cam grooves 17m-2 and the first cam followers 20n and the engaging relationship between the second inner cam grooves 17m-3 and the second cam followers 19n. As shown in FIGS. 15 and 16, the second-lens-group support ring 20 and the third-lens-group support ring 19 move in opposite directions away from each other in accordance with the cam profiles of the first inner cam grooves 17m-2 and the second inner cam grooves 17m-3, respectively, when the zoom lens barrel 11 advances from the accommodation state. Thereupon, at a mid-position during this forward movement of the second lens group support ring 20 to a position in the zooming range thereof, the first radially-retractable frame 40 which has retracted the second lens group LG2 downward to the radially-retracted position in the accommodation state of the zoom lens barrel 11 is disengaged from the second-lens-group-retracting cam-bar 54 of the third-lens-group support ring 19 and rotates about the second-lens-group pivot shaft 41 to the photographable position, in which the optical axis of the second lens group LG2 coincides with the photographing optical axis ZP, by the biasing force of the second-lens-group frame biasing spring F1. At this time, the rotation limit projection 40c comes in contact with the rotation limit projection 61 of the second-lens-group support ring 20, which determines the limit of rotation of the first radially-retractable frame 40 (i.e., the photographable position of the first radially-retractable frame 40) in the biasing direction of the second-lens-group frame biasing spring F1, while the rotation limit projection 40c partly engages with the axial-direction-movement limit projection 62 of the second-lens-group support ring 20 to limit the forward/rearward movement of the first radially-retractable frame 40 in the second lens group support ring 20. Thereupon, the first radially-retractable frame 40 remains held in the photographable position until the zoom lens barrel 11 is fully retracted again.

Furthermore, upon rotation of the cam ring 17, the first-lens-group support barrel 21, which is guided linearly via the second telescoping barrel 16, moves in the optical axis direction on the outer side of the cam ring 17 in accordance with a predetermined zoom path via the engaging relationship of the outer cam grooves 17m-1 with the first-lens-group cam followers 21n so that the distance between the first lens group LG1 and the second lens group LG2 becomes greater than that in the accommodation state of the zoom lens barrel 11 (see FIG. 16).

In other words, the forward-telescoping position of the first lens group LG1 with respect to the imaging plane (light-receiving surface) of the CCD 22 is determined by the total value of the forward moving amount of the cam ring 17 with respect to the stationary barrel 12 and the forward-telescoping moving amount of the first-lens-group support barrel 21 with respect to the cam ring 17. Furthermore, the forward-telescoping position of the second lens group LG2 is determined by the total value of forward moving amount of the cam ring 17 with respect to the stationary barrel 12 and the forward-telescoping amount of the second-lens-group support ring 20 with respect to the cam ring 17. Similarly, the forward-telescoping position of the third lens group LG3 is determined by the total value of the forward moving amount of the cam ring 17 with respect to the stationary barrel 12 and the forward-telescoping amount of the third-lens-group support ring 19 with respect to the cam ring 17. Zooming is carried out by moving the first lens group LG1, the second lens group LG2 and the third lens group LG3 along the photographing optical axis ZP while mutually changing the air-distances between the first lens group LG1, the second lens group LG2 and the third lens group LG3.

Upon the zoom lens barrel 11 being moved in a forward telescoping direction from the accommodation state of FIG. 4, the zoom lens barrel 11 first moves to a wide-angle photographing position as shown in the top half of FIG. 3, and in FIG. 1. Thereafter, upon the zoom motor further driving the zoom lens barrel 11 in the forward telescoping direction, the focal length of the photographing optical system gradually increases to the long focal length side thereof, so as to finally reach the telephoto extremity (long focal length extremity) as shown in the bottom half of FIG. 3, and in FIG. 2. In the photographing range (zooming range) from the wide-angle extremity to the telephoto extremity, the helicoid ring 13 and the first telescoping barrel 14 move in the optical axis direction while rotating and being guided by the female helicoid 27 of the stationary barrel 12 in accordance with movements of the zoom motor, similar to the case when the zoom lens barrel 11 is telescoped forward from the accommodation state to the photographable state (i.e., the wide-angle extremity). During this telescoping movement, the followers 17a of the cam ring 17 transfer from the lead groove portions 15c-L of the guide through-slots 15c to the circumferential groove portions 15c-S of the guide through-slots 15c, respectively, so that the cam ring 17 does not move in the optical axis direction relative to the first linear guide ring 15. However, since the first linear guide ring 15 does move (forward) together with the helicoid ring 13 and the first telescoping barrel 14 in the optical axis direction, the cam ring 17 also moves in the optical axis direction relative to the stationary barrel 12 while rotating relative thereto.

When the zoom lens barrel 11 is in a photographable state in the range from the wide-angle extremity to the telephoto extremity, focusing is carried out by moving the fourth-lens-group frame 30 along the photographing optical axis ZP by driving an AF motor (not shown) in accordance with object-distance data obtained from a distance measuring device (not shown).

Upon the main switch being turned OFF, the zoom motor is driven in a reverse direction so that the zoom lens barrel 11 moves in a rearward direction (lens-barrel retracting direction) by performing a rearward-telescoping operation in the reverse order of the forward-telescoping operation so as to arrive at the accommodation state shown in FIG. 4. At a mid-position during the rearward-telescoping movement toward the accommodation state, the third-lens-group frame 50 moves rearward together with the third-lens-group support ring 19 while swinging downward to the radially-retracted position from the photographable position via the cam function of the third-lens-group-retracting cam-bar 55 provided on the stationary CCD holder 23, and the first radially-retractable frame 40 also moves rearward together with the second-lens-group support ring 20 while swinging upward to the radially-retracted position from the photographable position via the cam function of the second-lens-group-retracting cam-bar 54.

As described above, a reduction in length of the zoom lens barrel 11 in the accommodation state thereof is achieved by the above illustrated arrangement in which the second lens group LG2 and the third lens group LG3 are mutually positioned vertically adjacent to each other on a common plane orthogonal to the photographing optical axis ZP, as shown in FIG. 4. Furthermore, the first radially-retractable frame 40 and the second radially-retractable frame 50 can be reliably stopped at the respective photographable positions thereof because the first radially-retractable frame 40 and the second radially-retractable frame 50 are prevented from moving in the optical axis direction relative to the second-lens-group support ring 20 and the third-lens-group support ring 19 when the second lens group LG2 and the third lens group LG3 rotate from the radially-retracted positions to the photographable positions, respectively, during the transition of the zoom lens barrel 11 from the accommodation state to the photographable state.

In view of movability and productivity, it is desirable that the first radially-retractable frame 40 and the second radially-retractable frame 50 be respectively supported by the second-lens-group support ring 20 and the third-lens-group support ring 19 with a certain amount of play allowing the first radially-retractable frame 40 and the second radially-retractable frame 50 to move slightly in the forward/rearward direction (the optical axis direction). For instance, in the relationship between the first radially-retractable frame 40 and the second-lens-group support ring 20, the cylindrical bearing arm 40b can slide on the second-lens-group pivot shaft 41 slightly in the axial direction thereof, and is biased rearward by the rearward-biasing spring F2 to be held at a position where the rear end surface of the cylindrical bearing arm 40b is in contact with the front surface of the shaft support portion 20c. Unlike such a structure, if a structure holding the front and rear end surfaces of the cylindrical bearing arm 40b between the shaft support plate 42 and the shaft support portion 20c from opposite sides of the cylindrical bearing arm 40b is adopted, no play is created in the cylindrical bearing arm 40b, so that the resistance to the sliding movement of the cylindrical bearing arm 40b increases to thereby possibly prevent the first radially-retractable frame 40 from rotating (swinging) smoothly if there is even a slight error in the distance between the shaft support plate 42 and the shaft support portion 20c or the length of the cylindrical bearing arm 40b in the optical axis direction. Accordingly, the first radially-retractable frame 40 in the present embodiment of the zoom lens barrel is supported by the second-lens-group support ring 20 so as to be allowed to move by a slight amount of movement in the forward/rearward direction relative to the second-lens-group support ring 20.

Although the first radially-retractable frame 40 is allowed to move in the optical axis direction in this manner, it is desirable that the first radially-retractable frame 40 be prevented from moving in the optical axis direction during a photographing operation. The first radially-retractable frame 40 that is biased rearward in the optical axis direction by the rearward-biasing spring F2 has room for moving forward relative to the second-lens-group support ring 20 against the spring force of the rearward-biasing spring F2. Hereupon, if an external impactive force is given to the zoom lens barrel 11 when, e.g., the camera is accidentally dropped to the ground with the rotation limit projection 40c and the rotation limit projection 61 being in contact with each other, the axial-direction-movement limit projection 62 prevents the first radially-retractable frame 40 from moving forward to prevent a malfunction of the first radially-retractable frame 40 (e.g., an excessive forward movement of the first radially-retractable frame 40 which makes the rotation limit projection 40c overpass the front end of the rotation limit projection 61) from occurring in the above illustrated embodiment of the zoom lens barrel 11. If the rotation limit projection 40c overrides the front end of the rotation limit projection 61, the first radially-retractable frame 40 further rotates downward beyond the photographable position, which makes the second lens group LG2 not positioned properly on the photographing optical axis ZP. However, such a malfunction does not occur in the present embodiment of the zoom lens barrel.

Although an advantage in installation of the axial-direction-movement limit projection 62 in the relationship between the first radially-retractable frame 40 and the second-lens-group support ring 20 has been discussed in the above description, a similar effect can be obtained also in the relationship between the third-lens-group frame 50 and the third-lens-group support ring 19 due to the installation of the axial-direction-movement limit projection 64 that limits the forward movement of the third-lens-group frame 50. Namely, the second radially-retractable frame 50 is prevented from being displaced in the forward/rearward direction during a photographing operation, and the second radially-retractable frame 50 can be held in the photographable position with stability.

Figure 22:
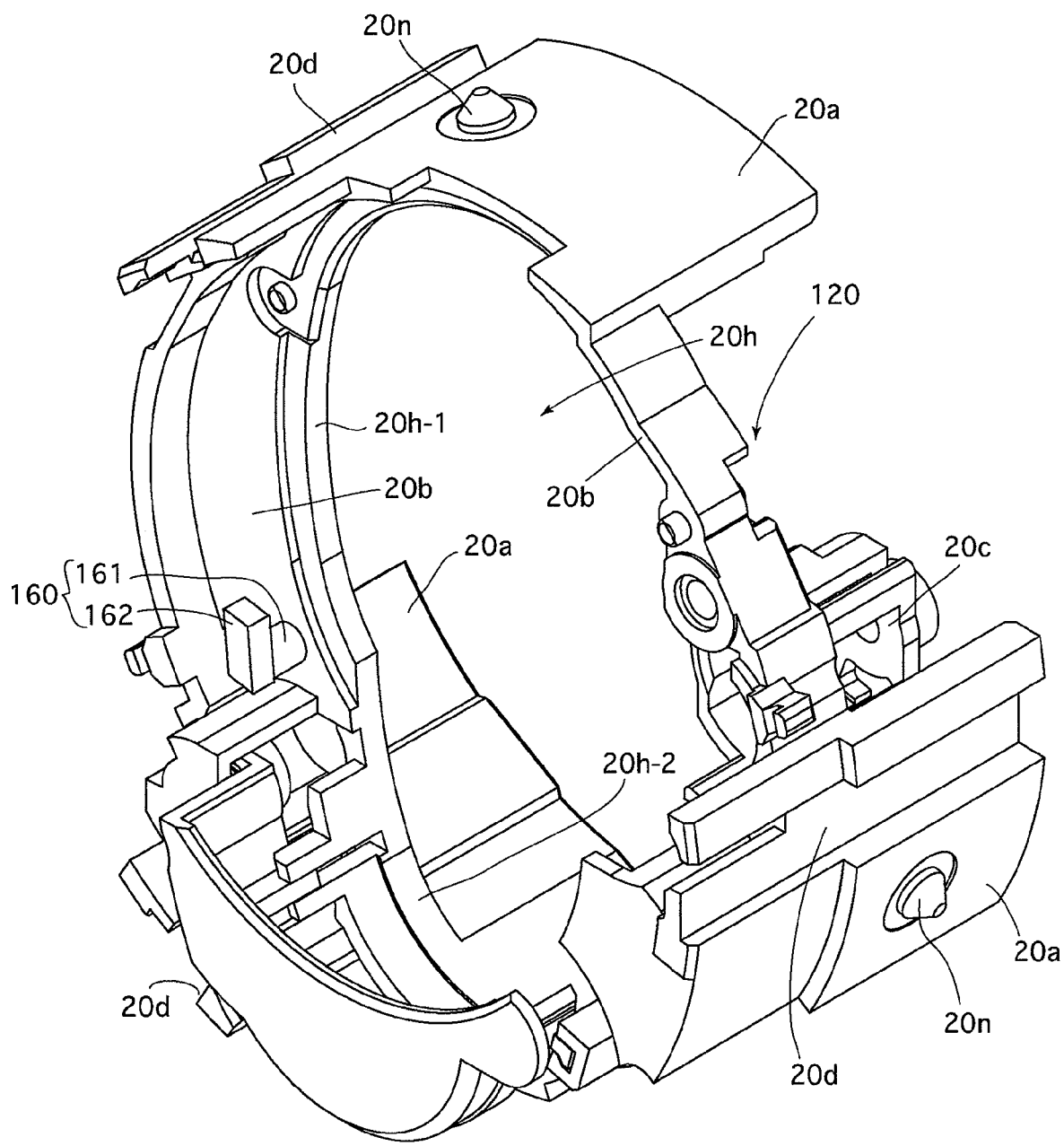
FIG. 22 is a perspective view of another embodiment of the second-lens-group support frame.

Although the rotation limit projection 61 and the axial-direction-movement limit projection 62 are provided independently of each other on the second-lens-group support ring 20 in the above described embodiment of the zoom lens barrel, the rotation limit projection 61 and the axial-direction-movement limit projection 62 can be formed integrally as a single projection as shown in FIG. 22. FIG. 22 shows another embodiment of the second-lens-group support ring, i.e., a second-lens-group support ring 120. The second-lens-group support ring 120 is provided, at a position corresponding to the position of the rotation limit projection 61 of the previous embodiment of the second-lens-group support ring 20, with a composite projection 160. The second-lens-group support ring 120 is identical in structure to the second-lens-group support ring 20 except for the structure of the composite projection 160, and elements and parts similar to those of the previous embodiment of the second-lens-group support ring 20 shown in FIG. 19 are designated by the same reference numerals in FIG. 22. The composite projection 160 is provided with a cylindrical rotation limit portion 161 which projects forward from the inner flange portion 20b and an axial-direction-movement limit (wide free end) 162 which is formed in such a manner as to bend a front end portion of the rotation limit portion 161 at a substantially right angle (i.e., to increase the thickness (width) of the composite projection 160 in a direction orthogonal to the photographing optical axis ZP). Similar to the rotation limit projection 61 of the previous embodiment of the second-lens-group support ring 20, the rotation limit portion 161 functions as a positioning portion for determining the limit of rotation of the first radially-retractable frame 40 at the photographable position by contacting with the rotation limit projection 40c. Similar to the upright wall portion 62b of the second-lens-group support ring 20, the axial-direction-movement limit 162 functions as an upright wall portion (optical-axis-direction-movement limit device) which prevents the rotation limit projection 40c from moving forward in a state where the rotation limit projection 40c is in contact with the rotation limit portion 161.

Although the present invention has been described with reference to the above described particular embodiments with reference to the accompanying drawings, the present invention is not limited thereto. For instance, each of the second lens group LG2 and the third lens group LG3 rotates (swings) between the radially-retracted position and the photographable position in the above described embodiment of the zoom lens barrel; however, the motion of each of the second lens group LG2 and the third lens group LG3 between the radially-retracted position and the photographable position is not limited to rotational motion. For instance, each of the second lens group LG2 and the third lens group LG3 can move linearly between the radially-retracted position and the photographable position.

Although the above illustrated embodiment of the zoom lens barrel 11 is provided with two radially-retractable optical elements, i.e., the second lens group LG2 and the third lens group LG3, the number of the radially-retractable optical elements is not limited to two; one or more than two is possible.

The present invention can be applied to not only a zoom lens barrel such as the above illustrated type of zoom lens barrel, but also any other type of zoom lens barrel as long as it is of a type which moves at least between a photographable state and an accommodation state. Accordingly, the present invention can be applied to a fixed-focal-length lens barrel, the focal length of which does not change in the photographable state of the lens barrel.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A lens barrel movable between a first state, in which a plurality of optical elements of a photographing optical system are all aligned on an optical axis, and a second state in which at least one radially-retractable optical element included in said plurality of optical elements is retracted to a radially-retracted position which is eccentric with respect to said optical axis and moved rearward in said optical axis direction, said lens barrel comprising:
    a support ring;
    a radially-retractable optical element holding frame which supports said radially-retractable optical element, and is supported by said support ring to be movable between a first position corresponding to said first state, in which said radially-retractable optical element is positioned on said optical axis, and a second position corresponding to said second state, in which said radially-retractable optical element is positioned at said radially-retracted position, said radially retractable optical element holding frame being movable for a predetermined distance in the optical axis direction relative to said supporting ring; and
    an optical-axis-direction-movement limit device which limits movement of said radially-retractable optical element holding frame in said optical axis direction relative to said support ring to a distance different than the predetermined distance when said radially-retractable optical element holding frame is at said first position.

2. The lens barrel according to claim 1, wherein said optical-axis-direction-movement limit device comprises:
    an outward projection which projects from said radially-retractable optical element holding frame in a direction substantially orthogonal to said optical axis; and
    an upright wall portion formed on said support ring, and positioned to face a surface of said outward projection in said optical axis direction when said radially-retractable optical element holding frame is at said first position.

3. The lens barrel according to claim 2, wherein said support ring comprises an inner flange portion which extends transverse to the optical axis and is spaced from said upright wall portion in said optical axis direction so as to extend parallel to said upright wall portion, and
    wherein said outward projection enters a space bounded by said inner flange portion and said upright wall portion when said radially-retractable optical element holding frame moves to said first position.

4. The lens barrel according to claim 3, wherein said support ring comprises a projection which projects from said inner flange portion, and wherein said upright wall extends from free end of said projection substantially perpendicular to said optical axis direction.

5. The lens barrel according to claim 3, wherein said inner flange portion of said support ring comprises a positioning portion which comes into contact with said radially-retractable optical element holding frame to thereby determine a limit of movement of said radially-retractable optical element holding frame at said first position.

6. The lens barrel according to claim 1, wherein said radially-retractable optical element holding frame rotates about a pivot substantially parallel to said optical axis, and
    wherein said optical-axis-direction-movement limit device comprises:
    an outward projection which projects from said radially-retractable optical element holding frame in a radial direction of said pivot; and
    an upright wall portion formed on said support ring, and positioned to face a surface of said outward projection in said optical axis direction when said radially-retractable optical element holding frame is at said first position.

7. The lens barrel according to claim 6, wherein said radially-retractable optical element holding frame comprises:
    a shaft support portion supported by said pivot to be rotatable about said pivot; and
    a holding frame portion which radially extends from said shaft support portion and supports said radially-retractable optical element, and
    wherein said outward projection projects from an outer peripheral surface of one of said shaft support portion and said holding frame portion.

8. The lens barrel according to claim 7, wherein said holding frame portion is formed as a ring-shaped holder and positioned inside said support ring.

9. The lens barrel according to claim 1, wherein said optical-axis-direction-movement limit device allows said radially-retractable optical element holding frame to move in said optical axis direction relative to said support ring when said radially-retractable optical element holding frame moves from said first position to said second position.

10. The lens barrel according to claim 1, wherein said radially-retractable optical element is one of said plurality of said optical elements of said photographing optical system which is positioned between frontmost and rearmost optical elements of said plurality of said optical elements of said photographing optical system.

11. The lens barrel according to claim 1, wherein said support ring is guided linearly in said optical axis direction without rotating.

12. The lens barrel according to claim 1, wherein said lens barrel is a retractable lens barrel, and
    wherein said lens barrel moves from said first state to said second state when fully retracted.

13. The lens barrel according to claim 1, wherein said radially-retractable optical element holding frame is biased in a direction toward said first position by a spring.

14. The lens barrel according to claim 1, wherein said radially-retractable optical element holding frame is biased in said optical axis direction away from said optical-axis-direction-movement limit device to abut against a stop portion of said support ring by a spring.

15. The lens barrel according to claim 1, further comprising a rotational movement limit device that limits movement of said radially retractable optical element holding frame in a direction transverse to the optical axis direction when said radially retractable optical element holding frame is at said first position, said rotational movement limit device being distinct from said optical axis movement limit device.

16. The lens barrel according to claim 15, said rotational movement limit device comprising a member projecting from said support ring in the optical axis direction, said optical axis direction movement limit device comprising a hook shaped member projecting from said support ring and spaced from said rotational movement limit device.

17. The lens barrel according to claim 15, said radially retractable optical element holding frame comprising a projection configured to abut both said rotational movement limit device and said optical axis direction movement limit device when said radially retractable optical element holding frame is in said first position.

18. A lens barrel comprising:

a support ring movable in a direction parallel to an optical axis;

a radially-retractable optical element holding frame which supports a radially-retractable optical element included in a plurality of optical elements of a photographing optical system, and is supported by said support ring to be movable between a first position, in which said radially-retractable optical element is positioned on said optical axis, and a second position, in which said radially-retractable optical element is positioned in a radially-retracted position which is eccentric with respect to said optical axis;

a positioning portion which is provided inside said support ring, extends in the optical axis direction, and comes into contact with said radially-retractable optical element holding frame to thereby determine a limit of rotational movement of said radially-retractable optical element holding frame at said first position; and an optical-axis-direction-movement limit device which limits movement of said radially-retractable optical element holding frame in said optical axis direction relative to said support ring when said radially-retractable optical element holding frame comes into contact with said positioning portion wherein the optical-axis-direction-movement limit device is arranged to limit movement of said radially-retractable optical element holding frame in the optical axis direction to prevent the radially-retractable optical element holding frame from moving beyond the positioning portion when the radially-retractable optical element holding frame is in the first state.

19. The lens barrel according to claim 18, said positioning portion being spaced form said optical axis direction movement limit device.

20. The lens according to claim 18, wherein said radially-retractable optical element holding frame is biased in a direction toward said first position by a spring.

* * * * *